United States Patent [19]

Tyler

[11] Patent Number: 4,992,939
[45] Date of Patent: Feb. 12, 1991

[54] METHOD OF PRODUCING NARRATIVE ANALYTICAL REPORT

[76] Inventor: Brian G. Tyler, 2671 S. Seamans Neck Rd., Seaford, N.Y. 11763

[21] Appl. No.: 229,346
[22] Filed: Aug. 5, 1988
[51] Int. Cl.[5] .............................................. G06G 7/52
[52] U.S. Cl. ..................................... 364/401; 364/408
[58] Field of Search ................ 364/408, 406, 401, 300

[56] References Cited

U.S. PATENT DOCUMENTS

| | | | |
|---|---|---|---|
| T. 998,008 | 9/1980 | DeLano, Jr. | 364/412 |
| 3,623,012 | 11/1971 | Lowery | 364/200 |
| 3,749,392 | 7/1978 | Stenning | 364/401 |
| 4,566,066 | 1/1986 | Towers | 364/408 |
| 4,642,767 | 2/1987 | Lerner | 364/408 |
| 4,642,768 | 2/1987 | Roberts | 364/408 |
| 4,643,038 | 3/1987 | Roberts et al. | 364/408 |
| 4,648,937 | 3/1987 | Valentino | 364/408 |
| 4,658,357 | 4/1987 | Carroll et al. | 364/406 |
| 4,674,043 | 6/1987 | Hernandez et al. | 364/401 |
| 4,700,297 | 10/1987 | Hagel, Sr. et al. | 364/408 |
| 4,722,055 | 1/1988 | Roberts | 364/408 |
| 4,734,564 | 3/1988 | Boston et al. | 235/380 |
| 4,736,294 | 4/1988 | Gill et al. | 364/408 |
| 4,823,265 | 4/1989 | Nelson | 364/406 |
| 4,831,526 | 5/1989 | Luchs et al. | 364/401 |

OTHER PUBLICATIONS

Aiweeki, "Financial Es Plans of Complex Future"; Jun. 15, 1988, p. 3.

Primary Examiner—Jerry Smith
Assistant Examiner—Kim Thanh T. Bui
Attorney, Agent, or Firm—Kane, Dalsimer, Sullivan, Kurucz, Levy, Eisele and Richard

[57] ABSTRACT

Method of producing a narrative analytical report. The system analyzes information which has been input to a database and, using predetermined phrases intermingled with extracts from the database, produces a narrative analytical report which describes the critical aspects of the database. The system also produces a listing of questions on those aspects of the database which require explanation of clarification. In the final output, the user's responses to the questions are integrated into the appropriate areas of the analytical report.

16 Claims, 3 Drawing Sheets

METHOD OF PRODUCING NARRATIVE ANALYTICAL REPORT

BACKGROUND OF THE INVENTION

It should initially be noted that the method has applications beyond the banking industry, however, for purposes of explanation the banking industry will be utilized as an example.

The process by which banks reach decisions to extend credit to commercial concerns varies in format but is generally universal in approach. The first step is to "spread" the company's financial statements. This is a standard banking term which involves transferring and summarizing the company's balance sheet, income statement and other financial information to a standardized "spread" form, from which ratios and other analytical information are calculated. The concept of spreading financial statements as a basis for financial analysis probably originated at the same time that banks and other financial institutions began analyzing the financial statements of their customers for credit purposes, underwriting of stock or other needs. While the spread forms varied in form by institution, they essentially provided the same information needed to reach the intended decision. Although computerized banking spread programs began to appear in the 1960's and are used more and more, many of the banks in the United States continue to do this by hand. The advent and growth of the personal computer (PC) has accelerated the use of generic mass-market spread-sheet programs (such as Lotus 1-2-3 ®). This growth has in turn, fostered the increase in PC based banking spread programs. The primary benefit to these specialized banking programs is to speed the spreading process by automating all of the various calculations needed to be made.

After completing the spread, the next step in reaching a credit decision is to prepare a written analysis of the key financial highlights and trends extracted from the spread to form the financial basis for a credit decision. This is prepared manually by either an analyst or the loan officer and usually requires several hours of time to review the spread, select the key analytical points to be covered in the analysis, develop questions to ask the management of the company to explain or clarify necessary items, then actually write the report. Subsequently, the report will normally be typed, rereviewed by the writer for additions or corrections and retyped as necessary. These reports vary in format and length depending on the policy of the institution, however, the key credit analysis topics reviewed in making a credit decision are largely universal.

Some of the potential shortfalls of this manual process include the overlooking of important analytical points especially by a less experienced individual and errors in figures by the analyst or the typist which are not caught by the individual reviewing the analysis who makes the final decision to make the loan. Since a majority of loans made by commercial banks are not secured by collateral and are primarily based on the analysis of financial statement trends, it is important that all key financial topics be covered accurately in the analysis.

Accordingly, for banking purposes, it would be desirable to have a computerized system which not only provides a format to spread financial statements, but would provide an automated credit analysis report which consistently examines the key analytical topics and makes comments on the financial health and performance of a company. It would further be desirable to have questions recommended to help the individual to fully understand the company's financial situation. The analytical comments and questions would be geared to the financial situation of the particular company and would arise from the examination of a standardized financial database, the spread.

For the purposes of other financial (or statistical) applications, it would be desirable to have a computerized system which could create a complex narrative analytical report from a given financial (or statistical) database The contents of the report if financial, would be geared to the particular financial health and performance of the subject of the database If statistical, the report would analyze the desired attributes of the particular statistical database.

SUMMARY OF THE INVENTION

It is therefore an object of the invention to provide a computerized system to produce a narrative credit analysis report in the usual banker's jargon as well as recommended questions for management which will be geared to a company's financial history. The report will cover the key credit analysis topics and make comments on the financial health and performance of the company based on the examination of a standardized database format to which the company's financial statement information can be input. Responses to the questions will be inserted into the appropriate areas of the narrative analysis in the finished output report.

It is further an object of the invention to provide a computerized system to produce a narrative analytical report and pertinent questions in the typical jargon of other specific financial applications which would be geared to the subject of the database. The database would consist of the subject's summarized financial statement information and/or any other information pertinent to the specific application. Responses to the questions will be inserted in the appropriate areas of the narrative analysis in the finished output report.

It is a further object of the invention to provide a computerized system to produce a narrative analytical report and pertinent questions from a standardized database of any type. Responses to the questions will be inserted in the appropriate areas of the narrative analysis in the finished output report.

The invention accomplishes the foregoing objectives as follows:

A company's balance sheet, income statement and other key financial information covering a desired period (in this case, three consecutive fiscal years) are input to a standardized spread format. This database contains the input raw financial information and is also programmed to calculate year-to-year increases/decreases, percentage changes, common size statements (all figures taken as a percentage of one other figure) a cash flow statement, numerous standard credit analysis highlight figures and ratios, together with a number of other reports some of which require additional user input such as standard industry information by SIC (Standard Industrial Code) classification. The information input to and processed within this database, properly selected, forms the source for the narrative analytical report.

The method used to produce the narrative analytical reports involves first supplying a predetermined set of written phrases/sentences which describe virtually every possible conclusion covering a key analytical topic (attribute of the database). These phrases/sentences are imbedded in mutually exclusive mathematical formulas designed to test the specific attributes of the particular database. Accordingly, when tested by the program, only the true (and therefore appropriate) phrase/sentence will be displayed. The program is further designed to insert actual figures from the database together with additional phrases adjacent to the tested phrase to produce complete written sentences.

The method broadly involves two distinct sections: The first section, as described in the preceding paragraph, provides an array of possible phrases for each analytical topic only one of which (that which is true) will be displayed. The other section of the program, that which displays the analytical report in final form, displays the one comment from the array which is applicable on the appropriate line in the final report. It should also be noted that the mathematical formulas are designed to filter out non-material and non-meaningful comments arising from changes in the database which a banker would consider as such based on years of experience. Accordingly, only those comments/questions related to important occurrences within the database from an experienced analytical viewpoint will be mentioned.

Using the same methodology, the invention also generates pages of recommended questions based upon an examination of the database. Space is allocated beneath each question for the user to type responses and/or comments directly onto the screen.

In the Completed Report, the original analytical report is automatically rewritten integrating the user's responses and comments into the appropriate areas of the report.

BRIEF DESCRIPTION OF THE DRAWINGS

Thus by the present invention, its objects and advantages will be realized the description of which should be taken in conjunction with the drawings wherein.

DETAILED DESCRIPTION OF THE PREFERRED EMBODIMENT

Turning now more particularly to the drawings, it should initially be noted that the invention has been designed using as the original vehicle, the Lotus 1-2-3® programming language, provided by Lotus 1-2-3® which is manufactured by Lotus Development Corp., Cambridge, Massachusetts. However, it could have been designed using other similar mathematical spread-sheet programs. The present method makes use of the inherent "cell structure" of such programs to link possible variations of text with numbers. Normally, unless done on a totally manual basis, analytical reports are manually written, then typed on a computer using word processing programs, however, these programs have no capacity to "think" by drawing conclusions. Mathematical spreadsheet programs have been principally designed to manipulate mathematical databases; while they have been used to produce form letters which match a standard letter body with various addressees, they have not been designed to produce complex and extensive narrative analytical reports which will vary line by line depending upon the particular database. The invention makes use of a mathematical spreadsheet program to produce narrative analytical reports from variable input to a standardized database format. The invention may be used on any IBM® Personal Computer or Compatible designed to use Lotus 1-2-3® Version 2.01.

Figure 1:
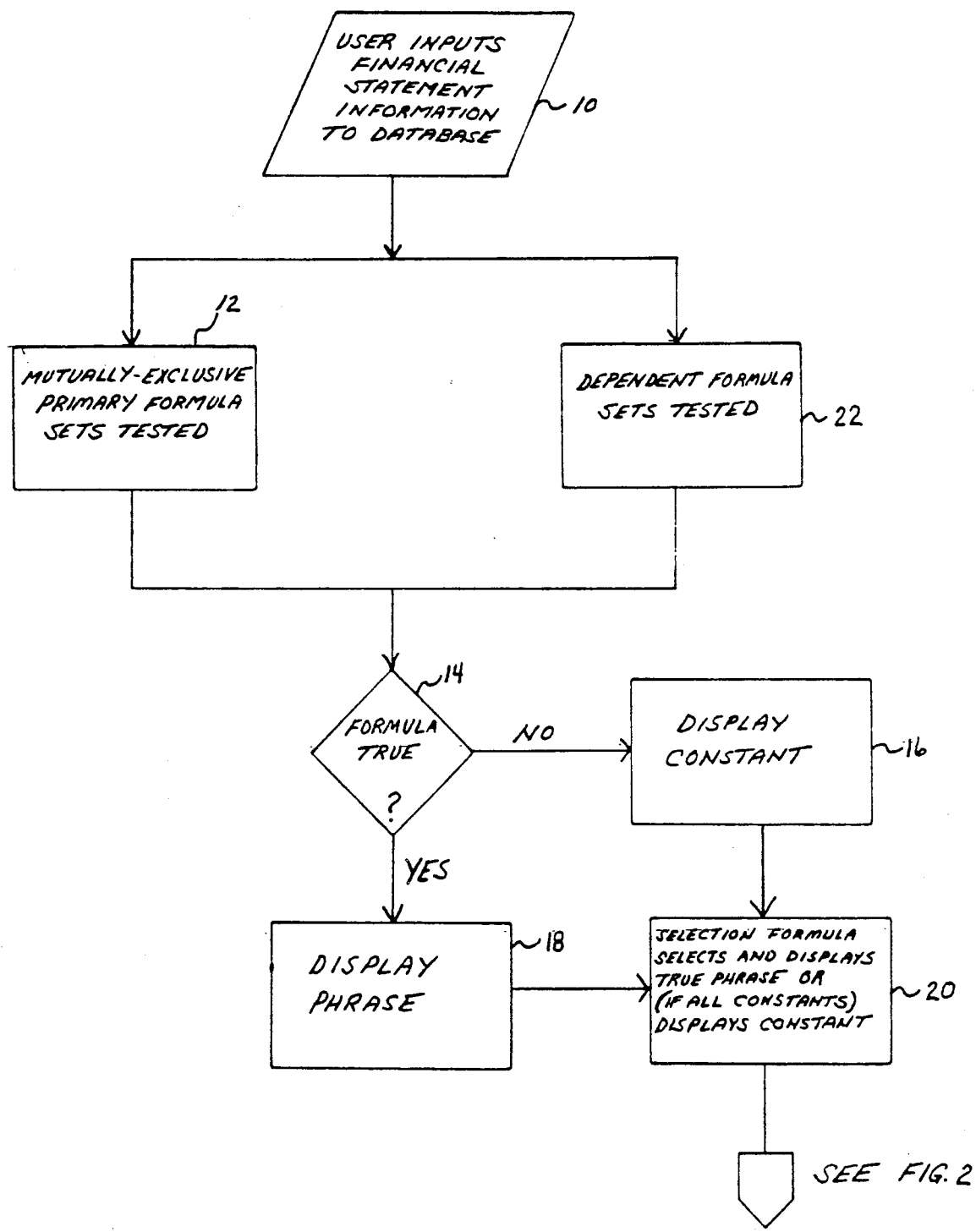
FIG. 1 is a flowchart of the decision determination selection portion of the method incorporating the teachings of the present invention.

The analysis method is comprised of the Decision Area and the Analytical Report Area. In this regard, referring to FIG. 1, illustrated is the methodology of the Decision Area of the program. The user, typically who is skilled in spreading financial statements, spreads the financial statements of a company (at block 10) into a Database Program designed in the Lotus 1-2-3® programming language. Other information is also input if available and/or desirable including industry information, selling and payment terms of the particular company, and various other data often important to the preparation of an in-depth financial analysis. The database format would vary somewhat with certain specialized industries such as utilities, banks, finance companies, airlines, insurance companies and others. This is due to the fact that specialized industries have unique asset, liability, income and expense structures which require a different format as well as different standard ratios and a different analytical approach. Such industry spread formats and analytical approaches are generally universal. The spread database format would also vary if the purpose of the analysis was other than to assist a credit decision. For example, the financial analysis of a publicly-held company in connection with the performance of its stock would require a somewhat different analytical approach than an analysis in connection with the making of a loan. In another instance, the database might differ entirely as would the analytical report if the database did not involve financial statements but covered some other statistical array of information which required analysis. However, it should be understood that such variation of the database format and its effect on particular analyses and conclusions to be reached would be readily apparent to one skilled in the art.

Once the data has been input to the Database Program, it is then integrated into the Analysis Program. For each analytical topic to be discussed in the analytical report, there is a set of mutually exclusive mathematical formulas (the Primary Formulas) which test (at 12) the appropriate attribute(s) of the database. Imbedded in each of these formulas is a narrative phrase or sentence which describes a possible conclusion or comment relating to the particular analytical topic. This set of formulas contains virtually every possible comment or conclusion concerning that analytical topic which would be drawn from the evaluation of the database. The criteria for being a Primary Formula is containing a complete sentence or containing a phrase which represents the beginning of a sentence. The formulas are designed to display the phrase or comment (at 18) if the mathematical test (at 14) is true. If the test is not true (at 16), a constant is displayed. Accordingly, for each set of mutually exclusive Primary Formulas, when tested, only one will display the correct phrase or comment describing the attribute of the particular database. The balance of formulas in the set will each display the constant.

As an example of a mutually exclusive set of Primary Formulas, an analytical topic discussed in the Analytical Report, is the Current Ratio which is the measure of a company's current assets divided by its current liabilities. This is a common indicator of a company's liquidity and is often viewed on a three year trend basis. For the purpose of this example, assume that the database calculates the following values for the Current Ratio for each of the fiscal years ending December 31 of 1985, 1986, and 1987:

|  | 1985 | 1986 | 1987 |
|---|---|---|---|
| Current Ratio | 1.94 | 1.65 | 1.49 |
| Further assume that the Lotus 1-2-3 ® cell address for each of these indicators is: | BA246 | BB246 | BC246 |

(In the Lotus ® cell address, the letters refer to locations of vertical columns and the numbers refer to locations of horizontal rows. The combination of the two pinpoints the exact cell address of an item of data. Here, the current ratio for 1987 is located in column BC at row 246.)

Additionally, the constant used to indicate that a formula is not true is a zero. (Another choice of constant could have been used such a the letter "X".)

The first Primary Formula in the set might read as follows:
BA262    @IF(@ROUND(BC246,1)>(@ROUND(BB246,1)+0.05)    #AND# @ROUND(BB246,1)>@ROUND(BA246,1),"The current ratio improved at the third consecutive year-end to","0")

This formula (itself located in cell BA262) translates as follows: if the value for the current ratio in 1987 (rounded to one decimal) is greater than the value for the current ratio in 1986 (rounded to one decimal; plus 0.05) and the rounded value for 1986 is itself greater than the rounded value for 1985 , display the phrase: The current ratio improved at the third consecutive year-end to; if this formula is not true, display a zero.

Other similar mutually exclusive formulas test these three database indicators to display one of the following phrases: BA263 The current ratio declined at the third consecutive year-end to BA264 The current ratio was roughly level with the prior year-end at BA265 The current ratio improved at year-end to a 3 year high point of BA266 The current ratio weakened at year-end to a 3 year low point of BA267 After weakening at prior year-end the current ratio improved to BA268 After improving at prior year-end the current ratio fell to BA269 The current ratio improved over its prior unchanged level to BA270 The current ratio declined form its prior unchanged level to The formulas often contain analytical judgement parameters to filter out non-material or non-meaningful comments. In this example, the judgement parameters involve rounding the data to one decimal point (as a movement of less than this would not be deemed meaningful) and ensuring that the most recent move is material by forcing it to exceed the prior year value by 0.05. Accordingly, the only true formula in this example is that in BA263 which will display the phrase: "The current ratio declined at the third consecutive year-end to".

The actual screen display for the current ratio selections in the Decision Area would appear as follows:

| BA | |
|---|---|
| 262 | 0 |
| 263 | The current ratio declined at the third consecutive year-end to |
| 264 | 0 |
| 265 | 0 |
| 266 | 0 |
| 267 | 0 |
| 268 | 0 |
| 269 | 0 |
| 270 | 0 |

This illustrates the display of the one true Primary Formula with all other Primary Formulas displaying the constant, zero.

In the preferred embodiment, beneath each Primary Formula set, a Selection Formula (at 20) tests each formula in the set to redisplay the one true phrase. The Selection Formula (itself located in BA271) is in the following format:
BA271    @IF(BA262<>"0",BA262,@IF(BA263<>"0",BA263,@IF(BA264<>"0",BA264,    @IF(BA265<>"0",BA265,@IF(BA266<>"0",BA266, @IF(BA267<>"0",BA267,@IF(BA268<>"0",BA268,@IF(BA269<>"0",BA269,    @IF(BA270<>"0",BA270,"0")))))))))

This translates as: if BA262 is not equal to zero (the constant) display its phrase, if BA263 is not equal to zero, display its phrase, and so forth through BA270. If all formulas should be equal to zero, the Selection Formula will also display a zero. (This can be a possibility if the particular test of database indicators is inappropriate based on the particular database.)

Other related formulas (or sets of related formulas) the Dependent Formulas, are simultaneously tested (at 22). These may contain additional phrases, database extracts, or punctuation and are designed to be displayed in order, adjacent to and to the right of the Primary Formulas described above if the Primary Formula is true. If the Primary Formula is not true, these will also display the constant. (These Dependent Formulas may vary depending upon which Primary Formula is the true one.) The combination of the one true Primary Formula and the adjacent Dependent Formula(s) form a complete sentence for inclusion in the Analytical Report.

The preferred embodiment for those situations where the Dependent Formula(s) do not vary depending on which Primary Formula is true is as follows: The Dependent Formulas are placed adjacent to the Selection Formula and if the Selection Formula is not equal to the constant, the Dependent Formulas then display the balance of the desired sentence. If the Selection Formula is equal to the constant, each Dependent Formula will also display the constant. (For an example of the preferred embodiment when the Dependent Formula(s) do vary, please see page 16.)

An example of Dependent Formulas are those necessary to complete the sentence describing the current ratio. In this instance, there are two Dependent Formulas: the first displays the value of the current ratio for 1987; the second displays a period.

The Dependent Formulas in this instance would be in the format:
BJ271 @IF(BA271<>"0",BC246,"0")

BK271 @IF(BJ271<>"0",".","0")

These formulas appear to the right of the Selection Formula allowing room for the narrative phrase to be displayed. The first translates as: if the Selection Formula in BA271 is not equal to zero (and therefore displays a phrase), display the value in BC246 (the current ratio for 1987), otherwise display a zero. The second translates as: if the Dependent Formula in BJ271 is not equal to zero, display a period, otherwise display a zero.

Accordingly, the complete Decision Area for the current ratio would be displayed on the screen as follows:

|     | PRIMARY FORMULAS |
| --- | --- |
|     | BA |
| 262 | 0 |
| 263 | The current ratio declined at the third consecutive year-end to |
| 264 | 0 |
| 265 | 0 |
| 266 | 0 |
| 267 | 0 |
| 268 | 0 |
| 269 | 0 |
| 270 | 0 |

| BA | BB | BC | BD | BE | BF | BG | BH | BI | BJ | BK |
| --- | --- | --- | --- | --- | --- | --- | --- | --- | --- | --- |
|  |  |  |  |  |  |  |  |  | DEPENDENT |  |
| SELECTION FORMULA |  |  |  |  |  |  |  |  | FORMULAS |  |
| 271 | The current ratio declined at the third consecutive year-end to 1.5. |

The two Dependent Formulas are shown in columns BJ and BK in row 271 (There are no formulas in cells BB271 - BI271.)

Figure 2:
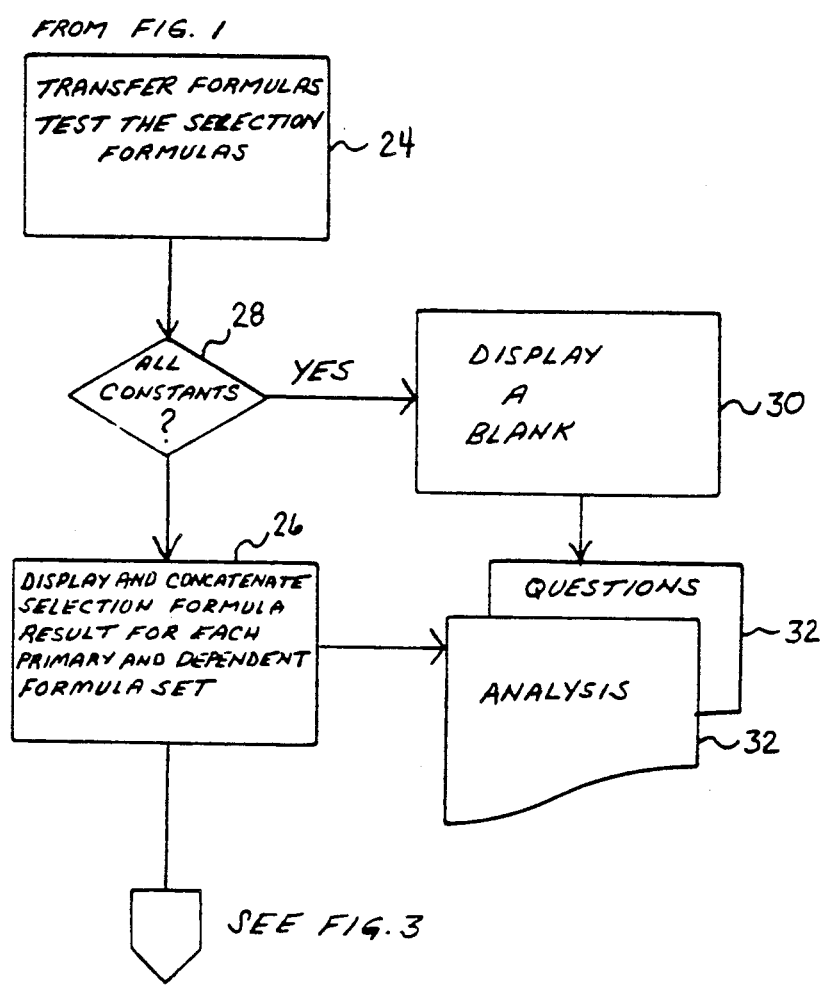
FIG. 2/is a flowchart of the transfer and printout portion of the method incorporating the teachings of the present invention.

Referring to FIG. 2, this chart illustrates the methodology of the Analytical Report Area of the analysis program. This area of the program contains a standardized heading format, which through formulas, duplicates information from the database such as the name of the company being analyzed, the most recent fiscal year being analyzed, the initials of the individual who spread the financial statements, and other general type information which will be displayed at the top of each report page. Additionally, there are fixed titles and subtitles of each analytical topic to be discussed. Within the areas between the fixed titles are Transfer Formulas (at 24) at the beginning of each line of the Analytical Report where a comment may be made. (Transfer Formulas are designed to display the Primary Formula and Dependent Formula(s) chosen by the Selection Formula (at 20). If the Selection Formula (and therefore the Dependent Formula.(s)) is equal to zero, the Transfer Formula will display a blank space (at 30).) These Transfer Formulas concatenate the Primary and Dependent formulas for optimal appearance of the final report. (Punctuation can be inserted in the concatenation process or incorporated into Dependent Formulas.) The result is to provide properly spaced complete sentences in the Analytical Report.

An example of a Transfer Formula for the current ratio comment is as follows:

(the period). If the Selection Formula is equal to zero, a blank would be displayed.

This Transfer Formula would thus display the following:

The current ratio declined at the third consecutive year-end to 1.5.

The Analytical Report Area for the current ratio is a portion of a single page under the fixed title "FINANCIAL CONDITION" and the fixed Subtitle, "Liquidity: Current Position". The following is an example of the actual screen display (and format of the printout) for this section. The current ratio comment appears as the middle sentence. The comments for the quick ratio and the last comparative comment are derived using the same methodology as that described above for the current ratio.

|      | BA |
| --- | --- |
| 1099 |  |
| 1100 |  |
| 1101 | FINANCIAL |
| 1102 | CONDITION |
| 1103 |  |
| 1104 |  |
| 1105 | LIQUIDITY - Current Position |
| 1106 |  |
| 1107 |  |
| 1108 |  |
| 1109 | The quick ratio declined from its prior static level to 0.6. |
| 1110 | The current ratio declined at the third consecutive year-end to 15. |
| 1111 | At year-end 1986 the quick and current ratios were 0.7 |
| 1112 | and 1.6, respectively. |

It should be noted that when printed, the cell column letters and row numbers are not included in the printout.)

Depending on the particular database, certain analytical comments may not be warranted. Accordingly, in these cases, all Primary Formulas in a particular set will not be true and thus each will display the constant; (the Selection Formula will therefore also display the constant). As noted previously, the Transfer Formulas are designed to display "blanks" (at 30) if the test (at 28) reveals that the Selection Formula or all component formulas in a Primary Formula set return constants. Thus in the Analytical Report Area, the only visable display is the results of those formulas which test true (at 26).

The Primary and Dependent formulas used to test the database vary in complexity depending upon the particular analytical topic. Some test data over a three year horizon to return the appropriate comment whereas some only test two years of data. The design of the formulas reflects a standard analytical approach within the banking industry. Additionally, some formulas may only search to see if certain information has been included in the database and, depending upon the importance of the information, a comment may or may not be

| BA |
| --- |
| 1110 @IF(BA271<>"0",BA271&" "&@STRING(BJ271,1)&BK271," ") |

This translates as: if BA271 (the Selection Formula) is not equal to zero, display its phrase, then add a space, then display Dependent Formula BJ271 (the current ratio value), then display Dependent Formula BK271 made. Other formulas test a large number of variables from the database to select the analytical comment and some apply a weight, prioritize, then identify the principal components which cause a particular change in the database. Analytical judgement parameters are built into many formulas to filter out comments on changes in the database which would be deemed non-meaningful or non-material to an experienced analyst.

An example of the preferred embodiment when the dependent Formulas do vary depending upon the true Primary Formula is seen in the second comment on sales.:

The first comment on the company's sales experience begins with the following Primary Formula possibilities:

Sales rose by
Sales fell by

Following the appropriate Primary Formula for the situation, Dependent Formulas will display the actual number percent; the word "percent"; the word "during"; the current year; the phrase "to a level of"; the current year sales amount; and a period. Therefore, if the sales level grew by 8% in the current year to $10,000 the Primary and Dependent formulas for the first comment would display "Sales rose by 8.00 percent during 1987 to a level of 10,000".

The next comment illustrates the variable Dependent Formulas. The Primary Formula for the next comment displays the phrase "This compares with a". There are then two Dependent Formulas. The first displays the percent change in the prior year. The second will vary depending upon whether that change was an increase or a decrease. This is illustrated as follows:

| PRIMARY FORMULA | DEPENDENT FORMULAS | |
|---|---|---|
| This compares with a | X% | increase in the prior period./decrease in the prior period. |

Selection Formula assuming a 7% increase in 1986;

This compares with a 7.00% increase in the prior period.

The Transfer Formula would display and concatenate this as follows:

This compares with a 7.00% increase in the prior period.

The methodology for the Questions program (FIG. 2 at 32) is identical in most respects to the analytical section in that there is a Decision Area and an Analytical Report area. Analytical judgement parameters and narrative question phrases are imbedded in Primary Formulas (at 12) which test the database (at 14) for changes or movements which would normally need to be explained or clarified by the management of the company. In certain cases there may only be one Primary Formula, to test one attribute of the database, or they may be a set of Primary Formulas to select the proper phrase. In many cases there will also be Dependent Formulas (at 22).

As an example, the database contains an input area for contingent liabilities (guarantees, lawsuits etc. which do not appear on a company's balance sheet). The Primary Formula in the Decision Area returns the sentence (at 18) "What is the specific nature of the contingent liabilities?" if there is an amount input to this area of the database. If no input is made, the formula returns the constant, zero (at 16). Here, as there is only one Primary Formula and no Dependent Formulas, the Selection Formula can be placed directly in the Analytical Report Area.

A certain number of lines are allocated in the Analytical Report Area of one of the pages of questions for this topic. A Selection Formula in the Analytical Report area tests for whether the Primary Formula is or is not equal to the constant. If it is not, the actual screen area of the Analytical Report Area appears as follows:

What is the specific nature of the contingent liabilities?
—
—
—

If the Selection Formula reveals that the Primary Formula is equal to the constant, these lines in the Final Report Area will be blank.

Figure 3:
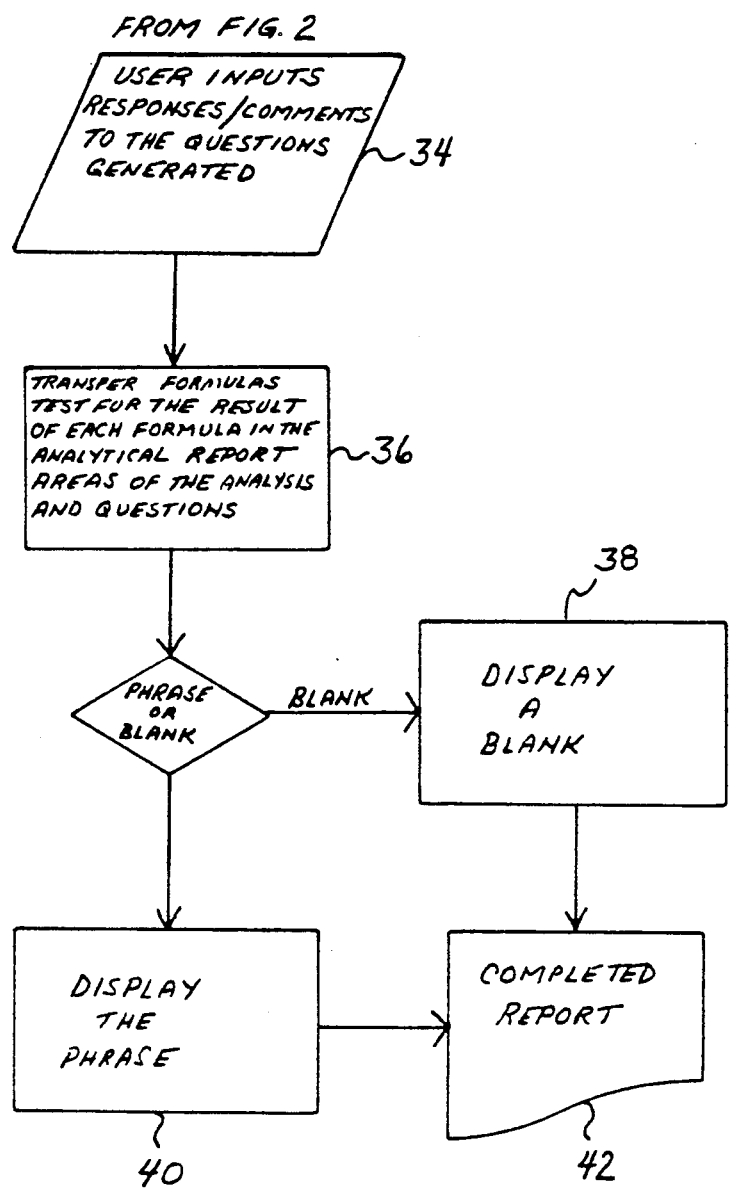
FIG. 3 is a flowchart of the portion of the method requesting additional data input and comments of the user which may be integrated into the Completed Report, incorporating the teachings of the present invention.

Referring to FIG. 3, the user may respond to the questions raised by entering answers or comments directly onto the screen (at 34) above the dotted lines provided. In the Completed Report, Transfer Formulas test (at 36) for the result of each (Transfer or Selection) Formula in the Analytical Report Area of the analysis and questions programs. If a phrase is displayed (representing a selected phrase in the analysis or a user's comment in the questions) it is redisplayed (at 40) in the Completed Report. If a blank is displayed in the analysis or questions program (representing an inappropriate section in the analysis, no question raised to respond to, or a user's choice not to respond) the blank (at 38) is redisplayed.

The Completed Report arranges the question response areas to integrate into the appropriate areas of the Analysis Analytical Report. For example, if the user responds to a question regarding sales, the response will be placed beneath the analysis program comment on sales in the Completed Report. If no response is entered by the user, this area allocated for a response will be blank. Accordingly, a complete narrative financial analysis is provided including an automated discussion of the actual significant attributes of and changes in the database together with explanations and clarifications provided by the user which are integrated into the appropriate areas (following the related comments) in the Completed Report.

Thus by the present invention, its objects and advantages will be realized and although a preferred embodiment has been disclosed and described in detail herein, its scope should not be limited hereby rather its scope should be determined by that of the appended claims.

EXAMPLE OF A DATABASE SPREAD OF A HYPOTHETICAL COMPANY, X-AMPLE CORP.

```
TACSPREAD           X - AMPLE CORPORATION                          ABC BANK
                    <ORD, NEW YORK

FISCAL    FISCAL    FISCAL
PRICE WATERHOUSE    UNQUAL    UNQUAL    UNQUAL
                    DEC 31    DEC 31    DEC 31           GRADE #
BGT / 6-23-88                                            CLASSIF NONE
                    1985      1986      1987                SIC       4242
MONTHS IN PERIOD    12        12        12
=================================================
BALANCE SHEET                [ $000 ]                    CURRENCY US$
=================================================
       ASSETS
Cash & Equivalent      332       366       197
Marketable Sec          20        30        40
Accounts Recvable     1168      1422      1653
Less:Reserve            36        45        50
Accounts Rec-Net      1132      1377      1603
Tax Refund Recvable     15        20        25
Inventory             2505      2387      2369
Prepaid Expenses        30        38        50
Other Curr Assets        2         2         2
Other Curr Assets      150       220       280
-----------------------------------------
   CURRENT ASSETS     4186      4440      4566
-----------------------------------------
Land                    45        45        45
Buildings              850       850       850
Machinery & Equipment 3000      3433      3752
Furniture & Fixtures   200       302       305
Automobiles             80        90       125
Leasehold Improvments   30        40        50
Other Fixed Assets      10        15        20
Total Fixed Assets    4215      4775      5147
Less:Accum Deprec     2235      2450      2700
-----------------------------------------
  Net Fixed Assets    1980      2325      2447
Invest & Advances       10        12        15
Officers Loans Receiv    5         7        10
Other receivables        2         4         6
Deposits                33        37        29
Other Assets            95       150       110
Goodwill                40        40        40
Restrictive Covenant    40        35        30
Other Intangibles       20        25        30
Total Intangibles      100       100       100
-----------------------------------------
   TOTAL ASSETS       6411      7075      7283
=================================================
       LIABILITIES
Notes Pay Bank / STD   850      1177      1391
Accounts Payable       502       508       476
Taxes Payable           98       100        70
Accrued Expenses       338       516       710
Other Current            0         5         0
Other Current          120       140       160
Current Portion LTD    250       250       250
-----------------------------------------
  CURRENT LIABILITIES 2158      2696      3057
-----------------------------------------
Long Term Debt        1330      1430      1260
Capital Leases           4         2         2
Oth Non-Currnt Liab    121        63         7
Deferred Taxes          25        15         5
TOTAL UNSUBORD LIAB   3638      4206      4331
Subordinated Liab        0         0        78
Minority Interest        5        10        15
   TOTAL LIABILITIES  3643      4216      4424
-----------------------------------------
       NET WORTH
Preferred Stock          0         0         0
Partners Capital      2768      2859      2859
Capital Surplus          0         0         0
Retained Earnings        0         0         0
Less: Treasury Stock     0         0         0
FX Transl Adj [+/-]      0         0         0
-----------------------------------------
   TOTAL NET WORTH    2768      2859      2859
-----------------------------------------
                      6411      7075      7283

MEMO:
CONTINGNT LIABILITIES 2000      2500      3000
```

```
INCOME STATEMENT                    [ $000 ]
==================================================
Gross Sales                  8550      9400    10000
Other Operat Revenues           0         0        0
Less:Retrns & Allownc           0         0        0
--------------------------------------------------
      NET SALES              8550      9400    10000
--------------------------------------------------
Cost of Sales                6332      6885     7254
Depreciation                  200       225      225
--------------------------------------------------
      GROSS PROFIT           2018      2290     2521
--------------------------------------------------
Officer Salaries              450       485      485
Other Salaries                326       388      474
Rent                          153       203      340
Insurance                      40        55      114
Professional Fees              35        70       40
Research /Development         186       235      300
Deprec & Amort                 15        25       25
Bad Debt Provision             85        96       95
Other SG&A Expense            389       384      365
Interest Expense              196       224      236
--------------------------------------------------
      OPERATING INCOME        143       125       47
--------------------------------------------------
Interest Income                37        46       50
Other Income/-Expense          32        35       74
Other Income/-Expense          -2        -4       -6
Equity Inc/-Loss Subs           1        -2        3
Min Int in Inc/-Loss            4         5        5
Extraord Items [+/-]           -5         6       -7
--------------------------------------------------
      PRE-TAX PROFIT          202       201      156
--------------------------------------------------
Current Taxes/-Credit          70        80        5
DeferredTaxes/-Credit          25       -10       -5
--------------------------------------------------
      NET PROFIT              107       131      156
--------------------------------------------------

Dividends                      23        43      156
Adj to Ret Earn [+/-]           0         3        0
Profit to Ret Earn             84        91        0

Beg Retained Earnings
End Retained Earnings           0
```

```
TACSPREAD              X - AMPLE CORPORATION                       ABC BANK
                       S   FORD, NEW YORK
                       /    IE

PRICE WATERHOUSE       FISCAL    FISCAL    FISCAL
                       UNQUAL    UNQUAL    UNQUAL
                       DEC 31    DEC 31    DEC 31
BGT / 6-23-88           1985      1986      1987          ---COMMON SIZE---
MONTHS IN PERIOD         12        12        12         1985    1986    1987
================================================================================
INCOME STATEMENT                 [ $000 ]                      [  %  ]
================================================================================
Gross Sales             8550      9400     10000       100.00  100.00  100.00
Other Operat Revenues      0         0         0         0.00    0.00    0.00
Less:Retrns & Allownc      0         0         0         0.00    0.00    0.00
    NET SALES           8550      9400     10000       100.00  100.00  100.00

Cost of Sales           6332      6885      7254        74.06   73.24   72.54
Depreciation             200       225       225         2.34    2.39    2.25
    GROSS PROFIT        2018      2290      2521        23.60   24.36   25.21

Officer Salaries         450       485       485         5.26    5.16    4.85
Other Salaries           326       388       474         3.81    4.13    4.74
Rent                     153       203       340         1.79    2.16    3.40
Insurance                 40        55       114         0.47    0.59    1.14
Professional Fees         35        70        40         0.41    0.74    0.40
Research /Development    186       235       300         2.18    2.50    3.00
Deprec & Amort            15        25        25         0.18    0.27    0.25
Bad Debt Provision        85        96        95         0.99    1.02    0.95
Other SG&A Expense       389       384       365         4.55    4.09    3.65
Interest Expense         196       224       236         2.29    2.38    2.36

OPERATING INCOME     143       125        47         1.67    1.33    0.47

Interest Income           37        46        50         0.43    0.49    0.50
Other Income/-Expense     32        35        74         0.37    0.37    0.74
Other Income/-Expense     -2        -4        -6        -0.02   -0.04   -0.06
Equity Inc/-Loss Subs      1        -2         3         0.01   -0.02    0.03
Min Int in Inc/-Loss       4         5         5         0.05    0.05    0.05
Extraord Items [+/-]      -5         6        -7        -0.06    0.06   -0.07

PRE-TAX PROFIT       202       201       156         2.36    2.14    1.56

Current Taxes/-Credit     70        80         5         0.82    0.85    0.05
DeferredTaxes/-Credit     25       -10        -5         0.29   -0.11   -0.05

NET PROFIT           107       131       156         1.25    1.39    1.56

Dividends                 23        43       156         0.27    0.46    1.56
Adj to Ret Earn [+/-]      0         3         0         0.00    0.03    0.00
Profit to Ret Earn        84        91         0         0.98    0.97    0.00

Beg Retained Earnings
End Retained Earnings      0
```

| TACSPREAD | X - AMPLE CORPORATION<br>FORD, NEW YORK | | | ABC BANK<br>INCR SOURCE OR DECR USE<br>- DECR SOURCE OR INCR USE |
|---|---|---|---|---|
| PRICE WATERHOUSE<br>BGT / 6-23-88<br>MONTHS IN PERIOD | | FISCAL<br>UNQUAL<br>DEC 31<br>1986<br>12 | FISCAL<br>UNQUAL<br>DEC 31<br>1987<br>12 | 1986<br>1987 |
| CASH FLOW | [ $000 ] | | | |
| Net Sales | | 9400 | 10000 | 600 |
| -Inc/Decr Receivables | | -245 | -226 | 19 |
| GROSS CASH REVENUES | | 9155 | 9774 | 619 |
| Cost of Sales | | -6885 | -7254 | -369 |
| -Inc/Decr Inventories | | 118 | 18 | -100 |
| Inc/-Decr Payables | | 6 | -32 | -38 |
| GROSS CASH PROFIT | | 2394 | 2506 | 112 |
| S G & A Expense | | -1916 | -2213 | -297 |
| -Inc/Decr Prepaid Exp | | -8 | -12 | -4 |
| Inc/-Decr Accrued Exp | | 178 | 194 | 16 |
| CASH AFTER OPERATING EXPENSE | | 648 | 475 | -173 |
| Non-Op Inc / -Exp | | 83 | 111 | 28 |
| Other Cash Inc / -Exp | | -166 | -58 | 108 |
| Income Taxes | | -83 | -45 | 38 |
| CASH AVAILABLE FOR INT & DIVS | | 482 | 483 | 1 |
| Interest Expense | | -224 | -236 | -12 |
| Dividends | | -43 | -156 | -113 |
| NET CASH INCOME | | 215 | 91 | -124 |
| Current Portion LongTerm Debt | | -250 | -250 | 0 |
| CASH AFTER DEBT SERVICE | | -35 | -159 | -124 |
| Capital Expenditures | | -595 | -372 | 223 |
| -Inc/Decr Investments/Advnces | | -4 | 0 | 4 |
| EXCESS CASH / -FINANCING NEED | | -634 | -531 | 103 |
| Inc/-Decr Notes Payable | | 327 | 214 | -113 |
| Inc/-Decr Unsub LongTerm Debt | | 348 | 80 | -268 |
| Inc/-Decr Subordinated Debt | | 0 | 78 | 78 |
| Inc/-Decr Equity | | 3 | 0 | -3 |
| CASH FROM FINANCING | | 678 | 372 | -306 |
| Cash After Financing | | 44 | -159 | -203 |
| Inc/-Decr Cash & Mrkt Secur | | 44 | -159 | -203 |
| MEMO:<br>Net Income + Non-Cash Items | | 378 | 403 | 25 |

```
TACSPREAD              X - AMPLE CORPORATION                      ABC BANK
                       S   FORD, NEW YORK         GRADE           #
                       I   NE                     CLASSIF         NONE
                                                  SIC             4242
                       FISCAL  FISCAL  FISCAL
PRICE WATERHOUSE       UNQUAL  UNQUAL  UNQUAL     INCR/   INCR/
                       DEC 31  DEC 31  DEC 31     -DECR   -DECR
BGT / 6-23-88           1985    1986    1987      1985    1986
MONTHS IN PERIOD         12      12      12       1986    1987
================================================================
RATIO ANALYSIS
================================================================

FINANCIAL INDICATORS [ $000 ]

QUICK ASSETS            1499    1793    1865       294      72
CURRENT ASSETS          4186    4440    4566       254     126
CURRENT LIABILITIES     2158    2696    3057       538     361
NET WORKING CAPITAL     2028    1744    1509      -284    -235
TOTAL UNSUBORD LIAB     3638    4206    4331       568     125
SUBORDINATED LIAB          0       0      78         0      78
TOTAL LIABILITIES       3643    4216    4424       573     208
TANGIBLE NET WORTH      2663    2752    2749        89      -3
CAPITAL BASE            2663    2752    2827        89      75
CONTINGNT LIABILITIES   2000    2500    3000       500     500
TOTAL ASSETS            6411    7075    7283       664     208
NET SALES               8550    9400   10000       850     600
NET INCOME               107     131     156        24      25

PERFORMANCE RATIOS [ % ]

SALES GROWTH                    9.94    6.38              -3.56
NET INCOME GROWTH              22.43   19.08              -3.35
GROSS PROFIT MARGIN    23.60   24.36   25.21      0.76    0.85
OPER PROFIT MARGIN      1.67    1.33    0.47     -0.34   -0.86
NET PROFIT MARGIN       1.25    1.39    1.56      0.14    0.17
INTEREST COVERAGE [X]   2.03    1.90    1.66     -0.13   -0.24
EFFECTIVE TAX RATE     47.03   34.83    0.00    -12.20  -34.83
DIVIDEND PAYOUT        21.50   32.82  100.00     11.32   67.18
RETURN ON AVG ASSETS            1.94    2.17              0.23
RETURN ON AVG EQUITY            4.66    5.46              0.80

CASH FLOW        [ $000 ]

NET CASH INCOME                  215      91              -124
CURRENT PORTION LTD             -250    -250                 0
CASH AFT DEBT SERVICE            -35    -159              -124
NET INC+NONCASH ITEMS    350     378     403        28      25

LIQUIDITY [ % ]

QUICK RATIO             0.69    0.67    0.61     -0.02   -0.06
CURRENT RATIO           1.94    1.65    1.49     -0.29   -0.16
CURRENT ASSETS/T U L    1.15    1.06    1.05     -0.09   -0.01
INVENTORY RELIANCE     26.31   37.83   50.32     11.52   12.49

TURNOVER RATIOS [ DAYS ]

A/R TURNOVER              48      53      59         5       6
A/R TURNOVER [AVG]                49      54                 5
INV TURNOVER             144     127     119       -17      -8
INV TURNOVER [AVG]               130     120                -10
A/P TURNOVER              29      27      24        -2      -3
W/C TURNOVER [ % ]      0.24    0.19    0.15     -0.05   -0.04

EST A/R WRITEOFFS                 87      90                 3
A/R RESERVE/GROSS A/R   3.08    3.16    3.02      0.08   -0.14

LEVERAGE [ % ]

TOT LIAB / TNW          1.37    1.53    1.61      0.16    0.08
TOT UNSUBLIAB/CAPBASE   1.37    1.53    1.54      0.16    0.01
TUL+CONTINGNT/CAPBASE   2.12    2.44    2.60      0.32    0.16

COMMENTS: _____
         _____
         _____
         _____
         _____
         _____
```

| TACSPREAD | X - AMPLE CORPORATION<br>S--FORD, NEW YORK<br>/ NE | | | ABC BANK |
|---|---|---|---|---|
| PRICE WATERHOUSE | FISCAL<br>UNQUAL<br>DEC 31 | FISCAL<br>UNQUAL<br>DEC 31 | FISCAL<br>UNQUAL<br>DEC 31 | |
| BGT / 6-23-88 | 1985 | 1986 | 1987 | |
| MONTHS IN PERIOD | 12 | 12 | 12 | |

==========================================================================
SUPPORTING SCHEDULES            [ $000 ]
==========================================================================

A/R AGING

| | | 1985 | 1986 | 1987 |
|---|---|---:|---:|---:|
| $ | Current | 883 | 1115 | 1165 |
| | 31 - 60 | 140 | 155 | 160 |
| | 61 - 90 | 65 | 96 | 130 |
| | 91 - 120 | 48 | 39 | 118 |
| | Over 120 | 32 | 17 | 80 |
| | TOTAL A/R | 1168 | 1422 | 1653 |
| % | Current | 75.60 | 78.41 | 70.48 |
| | 31 - 60 | 11.99 | 10.90 | 9.68 |
| | 61 - 90 | 5.57 | 6.75 | 7.86 |
| | 91 - 120 | 4.11 | 2.74 | 7.14 |
| | Over 120 | 2.74 | 1.20 | 4.84 |
| | TOTAL A/R | 100.00 | 100.00 | 100.00 |
| | TOTAL OVER 30 | 24.40 | 21.59 | 29.52 |
| | OVER 60 | 12.41 | 10.69 | 19.84 |
| | OVER 90 | 6.85 | 3.94 | 11.98 |
| | OVER 120 | 2.74 | 1.20 | 4.84 |

INVENTORY COMPOSITION

| | | 1985 | 1986 | 1987 |
|---|---|---:|---:|---:|
| $ | Raw Materials | 804 | 720 | 710 |
| | Work in Process | 1527 | 1384 | 1334 |
| | Finished Goods | 174 | 283 | 325 |
| | TOTAL INVENTORY | 2505 | 2387 | 2369 |
| % | Raw Materials | 32.10 | 30.16 | 29.97 |
| | Work in Process | 60.96 | 57.98 | 56.31 |
| | Finished Goods | 6.95 | 11.86 | 13.72 |
| | TOTAL INVENTORY | 100.00 | 100.00 | 100.00 |

LNG TRM DEBT MATURITY

| UNSUBORDINATED | 1985 | 1986 | 1987 | |
|---|---:|---:|---:|---:|
| Due w/in One Year | 250 | 250 | 250 | 250 |
| Due Second Year | 250 | 250 | 250 | |
| Due Third Year | 250 | 250 | 500 | |
| Due Fourth Year | 250 | 500 | 512 | |
| Due Fifth Year | 500 | 432 | 0 | |
| Subsequent | 84 | 0 | 0 | |
| UNSUB LONG TERM DEBT | 1584 | 1682 | 1512 | |

| SUBORDINATED | 1985 | 1986 | 1987 |
|---|---:|---:|---:|
| Due w/in One Year | 0 | 0 | 0 |
| Due Second Year | 0 | 0 | 0 |
| Due Third Year | 0 | 0 | 0 |
| Due Fourth Year | 0 | 0 | 0 |
| Due Fifth Year | 0 | 0 | 0 |
| Subsequent | 0 | 0 | 78 |
| SUBORD LONG TERM DEBT | 0 | 0 | 78 |

ADDITIONAL INFORMATION

| | 1985 | 1986 | 1987 | | |
|---|---:|---:|---:|---|---:|
| SELLING TERMS [DAYS] | 0 | 0 | 30 | | |
| PAYMENT TERMS [DAYS] | 0 | 0 | 30 | | |
| INVENTORY METHOD | 0 | 0 LIFO | | $ $000 | 1 |
| TAX STATUS [ C,S,P ] | P | P | P | $000,000 | 2 |
| SUBORD. AGRMT. AMOUNT | 0 | 0 | 0 | | 3 |
| PURCHASES INCL IN COS | 0 | 0 | 0 | SELECTION | 2 |

| TACSPREAD | X - AMPLE CORPORATION<br>S FORD, NEW YORK<br>NE | | | ABC BANK | | |
|---|---|---|---|---|---|---|
| PRICE WATERHOUSE<br>BGT / 6-23-88 | FISCAL<br>UNQUAL<br>DEC 31<br>1985 | FISCAL<br>UNQUAL<br>DEC 31<br>1986 | FISCAL<br>UNQUAL<br>DEC 31<br>1987 | ---COMMON SIZE---<br>1985 | 1986 | 1987 |
| BALANCE SHEET | [ $000 ] | | | [ % ] | | |
| ASSETS | | | | | | |
| Cash & Equivalent | 332 | 366 | 197 | 5.18 | 5.17 | 2.70 |
| Marketable Sec | 20 | 30 | 40 | 0.31 | 0.42 | 0.55 |
| Accounts Recvable | 1168 | 1422 | 1653 | 18.22 | 20.10 | 22.70 |
| Less:Reserve | 36 | 45 | 50 | 0.56 | 0.64 | 0.69 |
| Accounts Rec-Net | 1132 | 1377 | 1603 | 17.66 | 19.46 | 22.01 |
| Tax Refund Recvable | 15 | 20 | 25 | 0.23 | 0.28 | 0.34 |
| Inventory | 2505 | 2387 | 2369 | 39.07 | 33.74 | 32.53 |
| Prepaid Expenses | 30 | 38 | 50 | 0.47 | 0.54 | 0.69 |
| Other Curr Assets | 2 | 2 | 2 | 0.03 | 0.03 | 0.03 |
| Other Curr Assets | 150 | 220 | 280 | 2.34 | 3.11 | 3.84 |
| CURRENT ASSETS | 4186 | 4440 | 4566 | 65.29 | 62.76 | 62.69 |
| Land | 45 | 45 | 45 | 0.70 | 0.64 | 0.62 |
| Buildings | 850 | 850 | 850 | 13.26 | 12.01 | 11.67 |
| Machinery & Equipment | 3000 | 3433 | 3752 | 46.79 | 48.52 | 51.52 |
| Furniture & Fixtures | 200 | 302 | 305 | 3.12 | 4.27 | 4.19 |
| Automobiles | 80 | 90 | 125 | 1.25 | 1.27 | 1.72 |
| Leasehold Improvments | 30 | 40 | 50 | 0.47 | 0.57 | 0.69 |
| Other Fixed Assets | 10 | 15 | 20 | 0.16 | 0.21 | 0.27 |
| Total Fixed Assets | 4215 | 4775 | 5147 | 65.75 | 67.49 | 70.67 |
| Less:Accum Deprec | 2235 | 2450 | 2700 | 34.86 | 34.63 | 37.07 |
| Net Fixed Assets | 1980 | 2325 | 2447 | 30.88 | 32.86 | 33.60 |
| Invest & Advances | 10 | 12 | 15 | 0.16 | 0.17 | 0.21 |
| Officers Loans Receiv | 5 | 7 | 10 | 0.08 | 0.10 | 0.14 |
| Other receivables | 2 | 4 | 6 | 0.03 | 0.06 | 0.08 |
| Deposits | 33 | 37 | 29 | 0.51 | 0.52 | 0.40 |
| Other Assets | 95 | 150 | 110 | 1.48 | 2.12 | 1.51 |
| Goodwill | 40 | 40 | 40 | 0.62 | 0.57 | 0.55 |
| Restrictive Covenant | 40 | 35 | 30 | 0.62 | 0.49 | 0.41 |
| Other Intangibles | 20 | 25 | 30 | 0.31 | 0.35 | 0.41 |
| Total Intangibles | 100 | 100 | 100 | 1.56 | 1.41 | 1.37 |
| TOTAL ASSETS | 6411 | 7075 | 7283 | 100.00 | 100.00 | 100.00 |
| LIABILITIES | | | | | | |
| Notes Pay Bank / STD | 850 | 1177 | 1391 | 13.26 | 16.64 | 19.10 |
| Accounts Payable | 502 | 508 | 476 | 7.83 | 7.18 | 6.54 |
| Taxes Payable | 98 | 100 | 70 | 1.53 | 1.41 | 0.96 |
| Accrued Expenses | 338 | 516 | 710 | 5.27 | 7.29 | 9.75 |
| Other Current | 0 | 5 | 0 | 0.00 | 0.07 | 0.00 |
| Other Current | 120 | 140 | 160 | 1.87 | 1.98 | 2.20 |
| Current Portion LTD | 250 | 250 | 250 | 3.90 | 3.53 | 3.43 |
| CURRENT LIABILITIES | 2158 | 2696 | 3057 | 33.66 | 38.11 | 41.97 |
| Long Term Debt | 1330 | 1430 | 1260 | 20.75 | 20.21 | 17.30 |
| Capital Leases | 4 | 2 | 2 | 0.06 | 0.03 | 0.03 |
| Oth Non-Currnt Liab | 121 | 63 | 7 | 1.89 | 0.89 | 0.10 |
| Deferred Taxes | 25 | 15 | 5 | 0.39 | 0.21 | 0.07 |
| TOTAL UNSUBORD LIAB | 3638 | 4206 | 4331 | 56.75 | 59.45 | 59.47 |
| Subordinated Liab | 0 | 0 | 78 | 0.00 | 0.00 | 1.07 |
| Minority Interest | 5 | 10 | 15 | 0.08 | 0.14 | 0.21 |
| TOTAL LIABILITIES | 3643 | 4216 | 4424 | 56.82 | 59.59 | 60.74 |
| NET WORTH | | | | | | |
| Preferred Stock | 0 | 0 | 0 | 0.00 | 0.00 | 0.00 |
| Common Stock | 2768 | 2859 | 2859 | 43.18 | 40.41 | 39.26 |
| Capital Surplus | 0 | 0 | 0 | 0.00 | 0.00 | 0.00 |
| Retained Earnings | 0 | 0 | 0 | 0.00 | 0.00 | 0.00 |
| Less: Treasury Stock | 0 | 0 | 0 | 0.00 | 0.00 | 0.00 |
| FX Transl Adj [+/-] | 0 | 0 | 0 | 0.00 | 0.00 | 0.00 |
| TOTAL NET WORTH | 2768 | 2859 | 2859 | 43.18 | 40.41 | 39.26 |
| TOTAL LIAB & NETWORTH | 6411 | 7075 | 7283 | 100.00 | 100.00 | 100.00 |
| MEMO:<br>CONTINGNT LIABILITIES | 2000 | 2500 | 3000 | 31.20 | 35.34 | 41.19 |

| TACSPREAD | X - AMPLE CORPORATION<br>FORD, NEW YORK | | | | ABC BANK | |
|---|---|---|---|---|---|---|
| PRICE WATERHOUSE<br>BGT / 6-23-88 | FISCAL<br>UNQUAL<br>DEC 31<br>1985 | FISCAL<br>UNQUAL<br>DEC 31<br>1986 | FISCAL<br>UNQUAL<br>DEC 31<br>1987 | | INCR/<br>-DECR<br>1985<br>1986 | INCR/<br>-DECR<br>1986<br>1987 |

BALANCE SHEET [ $000 ]

| | 1985 | 1986 | 1987 | | 85-86 | 86-87 |
|---|---|---|---|---|---|---|
| ASSETS | | | | | | |
| Cash & Equivalent | 332 | 366 | 197 | | 34 | -169 |
| Marketable Sec | 20 | 30 | 40 | | 10 | 10 |
| Accounts Recvable | 1168 | 1422 | 1653 | | 254 | 231 |
| Less:Reserve | 36 | 45 | 50 | | 9 | 5 |
| Accounts Rec-Net | 1132 | 1377 | 1603 | | 245 | 226 |
| Tax Refund Recvable | 15 | 20 | 25 | | 5 | 5 |
| Inventory | 2505 | 2387 | 2369 | | -118 | -18 |
| Prepaid Expenses | 30 | 38 | 50 | | 8 | 12 |
| Other Curr Assets | 2 | 2 | 2 | | 0 | 0 |
| Other Curr Assets | 150 | 220 | 280 | | 70 | 60 |
| CURRENT ASSETS | 4186 | 4440 | 4566 | | 254 | 126 |
| Land | 45 | 45 | 45 | | 0 | 0 |
| Buildings | 850 | 850 | 850 | | 0 | 0 |
| Machinery & Equipment | 3000 | 3433 | 3752 | | 433 | 319 |
| Furniture & Fixtures | 200 | 302 | 305 | | 102 | 3 |
| Automobiles | 80 | 90 | 125 | | 10 | 35 |
| Leasehold Improvments | 30 | 40 | 50 | | 10 | 10 |
| Other Fixed Assets | 10 | 15 | 20 | | 5 | 5 |
| Total Fixed Assets | 4215 | 4775 | 5147 | | 560 | 372 |
| Less:Accum Deprec | 2235 | 2450 | 2700 | | 215 | 250 |
| Net Fixed Assets | 1980 | 2325 | 2447 | | 345 | 122 |
| Invest & Advances | 10 | 12 | 15 | | 2 | 3 |
| Officers Loans Receiv | 5 | 7 | 10 | | 2 | 3 |
| Other receivables | 2 | 4 | 6 | | 2 | 2 |
| Deposits | 33 | 37 | 29 | | 4 | -8 |
| Other Assets | 95 | 150 | 110 | | 55 | -40 |
| Goodwill | 40 | 40 | 40 | | 0 | 0 |
| Restrictive Covenant | 40 | 35 | 30 | | -5 | -5 |
| Other Intangibles | 20 | 25 | 30 | | 5 | 5 |
| Total Intangibles | 100 | 100 | 100 | | 0 | 0 |
| TOTAL ASSETS | 6411 | 7075 | 7283 | | 664 | 208 |
| LIABILITIES | | | | | | |
| Notes Pay Bank / STD | 850 | 1177 | 1391 | | 327 | 214 |
| Accounts Payable | 502 | 508 | 476 | | 6 | -32 |
| Taxes Payable | 98 | 100 | 70 | | 2 | -30 |
| Accrued Expenses | 338 | 516 | 710 | | 178 | 194 |
| Other Current | 0 | 5 | 0 | | 5 | -5 |
| Other Current | 120 | 140 | 160 | | 20 | 20 |
| Current Portion LTD | 250 | 250 | 250 | | 0 | 0 |
| CURRENT LIABILITIES | 2158 | 2696 | 3057 | | 538 | 361 |
| Long Term Debt | 1330 | 1430 | 1260 | | 100 | -170 |
| Capital Leases | 4 | 2 | 2 | | -2 | 0 |
| Oth Non-Currnt Liab | 121 | 63 | 7 | | -58 | -56 |
| Deferred Taxes | 25 | 15 | 5 | | -10 | -10 |
| TOTAL UNSUBORD LIAB | 3638 | 4206 | 4331 | | 568 | 125 |
| Subordinated Liab | 0 | 0 | 78 | | 0 | 78 |
| Minority Interest | 5 | 10 | 15 | | 5 | 5 |
| TOTAL LIABILITIES | 3643 | 4216 | 4424 | | 573 | 208 |
| NET WORTH | | | | | | |
| Preferred Stock | 0 | 0 | 0 | | 0 | 0 |
| Common Stock | 2768 | 2859 | 2859 | | 91 | 0 |
| Capital Surplus | 0 | 0 | 0 | | 0 | 0 |
| Retained Earnings | 0 | 0 | 0 | | 0 | 0 |
| Less: Treasury Stock | 0 | 0 | 0 | | 0 | 0 |
| FX Transl Adj [+/-] | 0 | 0 | 0 | | 0 | 0 |
| TOTAL NET WORTH | 2768 | 2859 | 2859 | | 91 | 0 |
| TOTAL LIAB & NETWORTH | 6411 | 7075 | 7283 | | 664 | 208 |
| MEMO: | | | | | | |
| CONTINGNT LIABILITIES | 2000 | 2500 | 3000 | | 500 | 500 |

| TACSPREAD | X - AMPLE CORPORATION<br>SEAFORD, NEW YORK<br>A NE | | | ABC BANK | |
|---|---|---|---|---|---|
| PRICE WATERHOUSE | FISCAL<br>UNQUAL<br>DEC 31 | FISCAL<br>UNQUAL<br>DEC 31 | FISCAL<br>UNQUAL<br>DEC 31 | PERCENT<br>CHANGE | |
| BGT / 6-23-88 | 1985 | 1986 | 1987 | 1985<br>1986 | 1986<br>1987 |
| BALANCE SHEET | [ $000 ] | | | [ % ] | |
| ASSETS | | | | | |
| Cash & Equivalent | 332 | 366 | 197 | 10.24 | -46.17 |
| Marketable Sec | 20 | 30 | 40 | 50.00 | 33.33 |
| Accounts Recvable | 1168 | 1422 | 1653 | 21.75 | 16.24 |
| Less:Reserve | 36 | 45 | 50 | 25.00 | 11.11 |
| Accounts Rec-Net | 1132 | 1377 | 1603 | 21.64 | 16.41 |
| Tax Refund Recvable | 15 | 20 | 25 | 33.33 | 25.00 |
| Inventory | 2505 | 2387 | 2369 | -4.71 | -0.75 |
| Prepaid Expenses | 30 | 38 | 50 | 26.67 | 31.58 |
| Other Curr Assets | 2 | 2 | 2 | 0.00 | 0.00 |
| Other Curr Assets | 150 | 220 | 280 | 46.67 | 27.27 |
| CURRENT ASSETS | 4186 | 4440 | 4566 | 6.07 | 2.84 |
| Land | 45 | 45 | 45 | 0.00 | 0.00 |
| Buildings | 850 | 850 | 850 | 0.00 | 0.00 |
| Machinery & Equipment | 3000 | 3433 | 3752 | 14.43 | 9.29 |
| Furniture & Fixtures | 200 | 302 | 305 | 51.00 | 0.99 |
| Automobiles | 80 | 90 | 125 | 12.50 | 38.89 |
| Leasehold Improvments | 30 | 40 | 50 | 33.33 | 25.00 |
| Other Fixed Assets | 10 | 15 | 20 | 50.00 | 33.33 |
| Total Fixed Assets | 4215 | 4775 | 5147 | 13.29 | 7.79 |
| Less:Accum Deprec | 2235 | 2450 | 2700 | 9.62 | 10.20 |
| Net Fixed Assets | 1980 | 2325 | 2447 | 17.42 | 5.25 |
| Invest & Advances | 10 | 12 | 15 | 20.00 | 25.00 |
| Officers Loans Receiv | 5 | 7 | 10 | 40.00 | 42.86 |
| Other receivables | 2 | 4 | 6 | 100.00 | 50.00 |
| Deposits | 33 | 37 | 29 | 12.12 | -21.62 |
| Other Assets | 95 | 150 | 110 | 57.89 | -26.67 |
| Goodwill | 40 | 40 | 40 | 0.00 | 0.00 |
| Restrictive Covenant | 40 | 35 | 30 | -12.50 | -14.29 |
| Other Intangibles | 20 | 25 | 30 | 25.00 | 20.00 |
| Total Intangibles | 100 | 100 | 100 | 0.00 | 0.00 |
| TOTAL ASSETS | 6411 | 7075 | 7283 | 10.36 | 2.94 |
| LIABILITIES | | | | | |
| Notes Pay Bank / STD | 850 | 1177 | 1391 | 38.47 | 18.18 |
| Accounts Payable | 502 | 508 | 476 | 1.20 | -6.30 |
| Taxes Payable | 98 | 100 | 70 | 2.04 | -30.00 |
| Accrued Expenses | 338 | 516 | 710 | 52.66 | 37.60 |
| Other Current | 0 | 5 | 0 | N/A | -100.00 |
| Other Current | 120 | 140 | 160 | 16.67 | 14.29 |
| Current Portion LTD | 250 | 250 | 250 | 0.00 | 0.00 |
| CURRENT LIABILITIES | 2158 | 2696 | 3057 | 24.93 | 13.39 |
| Long Term Debt | 1330 | 1430 | 1260 | 7.52 | -11.89 |
| Capital Leases | 4 | 2 | 2 | -50.00 | 0.00 |
| Oth Non-Currnt Liab | 121 | 63 | 7 | -47.93 | -88.89 |
| Deferred Taxes | 25 | 15 | 5 | -40.00 | -66.67 |
| TOTAL UNSUBORD LIAB | 3638 | 4206 | 4331 | 15.61 | 2.97 |
| Subordinated Liab | 0 | 0 | 78 | N/A | N/A |
| Minority Interest | 5 | 10 | 15 | 100.00 | 50.00 |
| TOTAL LIABILITIES | 3643 | 4216 | 4424 | 15.73 | 4.93 |
| NET WORTH | | | | | |
| Preferred Stock | 0 | 0 | 0 | N/A | N/A |
| Common Stock | 2768 | 2859 | 2859 | 3.29 | 0.00 |
| Capital Surplus | 0 | 0 | 0 | N/A | N/A |
| Retained Earnings | 0 | 0 | 0 | N/A | N/A |
| Less: Treasury Stock | 0 | 0 | 0 | N/A | N/A |
| FX Transl Adj [+/-] | 0 | 0 | 0 | N/A | N/A |
| TOTAL NET WORTH | 2768 | 2859 | 2859 | 3.29 | 0.00 |
| TOTAL LIAB & NETWORTH | 6411 | 7075 | 7283 | 10.36 | 2.94 |
| MEMO:<br>CONTINGNT LIABILITIES | 2000 | 2500 | 3000 | 25.00 | 20.00 |

| TACSPREAD | X - AMPLE CORPORATION<br>SEAFORD, NEW YORK<br>A-ONE | | | | ABC BANK |
|---|---|---|---|---|---|
| PRICE WATERHOUSE<br>BGT / 6-23-88<br>MONTHS IN PERIOD | FISCAL<br>UNQUAL<br>DEC 31<br>1985<br>12 | FISCAL<br>UNQUAL<br>DEC 31<br>1986<br>12 | FISCAL<br>UNQUAL<br>DEC 31<br>1987<br>12 | INCR/<br>-DECR<br>1985<br>1986 | INCR/<br>-DECR<br>1986<br>1987 |
| INCOME STATEMENT | [ $000 ] | | | | |
| Gross Sales | 8550 | 9400 | 10000 | 850 | 600 |
| Other Operat Revenues | 0 | 0 | 0 | 0 | 0 |
| Less:Retrns & Allownc | 0 | 0 | 0 | 0 | 0 |
| NET SALES | 8550 | 9400 | 10000 | 850 | 600 |
| Cost of Sales | 6332 | 6885 | 7254 | 553 | 369 |
| Depreciation | 200 | 225 | 225 | 25 | 0 |
| GROSS PROFIT | 2018 | 2290 | 2521 | 272 | 231 |
| Officer Salaries | 450 | 485 | 485 | 35 | 0 |
| Other Salaries | 326 | 388 | 474 | 62 | 86 |
| Rent | 153 | 203 | 340 | 50 | 137 |
| Insurance | 40 | 55 | 114 | 15 | 59 |
| Professional Fees | 35 | 70 | 40 | 35 | -30 |
| Research /Development | 186 | 235 | 300 | 49 | 65 |
| Deprec & Amort | 15 | 25 | 25 | 10 | 0 |
| Bad Debt Provision | 85 | 96 | 95 | 11 | -1 |
| Other SG&A Expense | 389 | 384 | 365 | -5 | -19 |
| Interest Expense | 196 | 224 | 236 | 28 | 12 |
| OPERATING INCOME | 143 | 125 | 47 | -18 | -78 |
| Interest Income | 37 | 46 | 50 | 9 | 4 |
| Other Income/-Expense | 32 | 35 | 74 | 3 | 39 |
| Other Income/-Expense | -2 | -4 | -6 | -2 | -2 |
| Equity Inc/-Loss Subs | 1 | -2 | 3 | -3 | 5 |
| Min Int in Inc/-Loss | 4 | 5 | 5 | 1 | 0 |
| Extraord Items [+/-] | -5 | 6 | -7 | 11 | -13 |
| PRE-TAX PROFIT | 202 | 201 | 156 | -1 | -45 |
| Current Taxes/-Credit | 70 | 80 | 5 | 10 | -75 |
| DeferredTaxes/-Credit | 25 | -10 | -5 | -35 | 5 |
| NET PROFIT | 107 | 131 | 156 | 24 | 25 |
| Dividends | 23 | 43 | 156 | 20 | 113 |
| Adj to Ret Earn [+/-] | 0 | 3 | 0 | 3 | -3 |
| Profit to Ret Earn | 84 | 91 | 0 | 7 | -91 |
| Beg Retained Earnings | | | | | |
| End Retained Earnings | 0 | | | | |

| TACSPREAD | X – AMPLE CORPORATION<br>SEAFORD, NEW YORK<br>ALONE | | | | ABC BANK | |
|---|---|---|---|---|---|---|
| PRICE WATERHOUSE<br>BGT / 6-23-88<br>MONTHS IN PERIOD | FISCAL<br>UNQUAL<br>DEC 31<br>1985<br>12 | FISCAL<br>UNQUAL<br>DEC 31<br>1986<br>12 | FISCAL<br>UNQUAL<br>DEC 31<br>1987<br>12 | PERCENT<br>CHANGE<br>1985<br>1986 | | 1986<br>1987 |
| INCOME STATEMENT | [ $000 ] | | | [ % ] | | |
| Gross Sales<br>Other Operat Revenues<br>Less:Retrns & Allownc | 8550<br>0<br>0 | 9400<br>0<br>0 | 10000<br>0<br>0 | 9.94<br>N/A<br>N/A | | 6.38<br>N/A<br>N/A |
| NET SALES | 8550 | 9400 | 10000 | 9.94 | | 6.38 |
| Cost of Sales<br>Depreciation | 6332<br>200 | 6885<br>225 | 7254<br>225 | 8.73<br>12.50 | | 5.36<br>0.00 |
| GROSS PROFIT | 2018 | 2290 | 2521 | 13.48 | | 10.09 |
| Officer Salaries<br>Other Salaries<br>Rent<br>Insurance<br>Professional Fees<br>Research /Development<br>Deprec & Amort<br>Bad Debt Provision<br>Other SG&A Expense<br>Interest Expense | 450<br>326<br>153<br>40<br>35<br>186<br>15<br>85<br>389<br>196 | 485<br>388<br>203<br>55<br>70<br>235<br>25<br>96<br>384<br>224 | 485<br>474<br>340<br>114<br>40<br>300<br>25<br>95<br>365<br>236 | 7.78<br>19.02<br>32.68<br>37.50<br>100.00<br>26.34<br>66.67<br>12.94<br>-1.29<br>14.29 | | 0.00<br>22.16<br>67.49<br>107.27<br>-42.86<br>27.66<br>0.00<br>-1.04<br>-4.95<br>5.36 |
| OPERATING INCOME | 143 | 125 | 47 | -12.59 | | -62.40 |
| Interest Income<br>Other Income/-Expense<br>Other Income/-Expense<br>Equity Inc/-Loss Subs<br>Min Int in Inc/-Loss<br>Extraord Items [+/-] | 37<br>32<br>-2<br>1<br>4<br>-5 | 46<br>35<br>-4<br>-2<br>5<br>6 | 50<br>74<br>-6<br>3<br>5<br>-7 | 24.32<br>9.38<br>100.00<br>-300.00<br>25.00<br>-220.00 | | 8.70<br>111.43<br>50.00<br>-250.00<br>0.00<br>-216.67 |
| PRE-TAX PROFIT | 202 | 201 | 156 | -0.50 | | -22.39 |
| Current Taxes/-Credit<br>DeferredTaxes/-Credit | 70<br>25 | 80<br>-10 | 5<br>-5 | 14.29<br>-140.00 | | -93.75<br>-50.00 |
| NET PROFIT | 107 | 131 | 156 | 22.43 | | 19.08 |
| Dividends<br>Adj to Ret Earn [+/-]<br>Profit to Ret Earn | 23<br>0<br>84 | 43<br>-3<br>91 | 156<br>0<br>0 | 86.96<br>8.33 | | 262.79<br>-100.00 |
| Beg Retained Earnings<br>End Retained Earnings | 0 | | | | | |

EXAMPLE OF ANALYSIS ANALYTICAL REPORT ON HYPOTHETICAL COMPANY X-AMPLE CORP. BASED ON ATTACHED DATABASE

```
TAC ANALYST              X - AMPLE CORPORATION                    ABC BAN
                         SEAFORD, NEW YORK
BGT / 6-23-88                                                FISCAL  1987
=========================  ==============================  ======================
TAC    ANALYST    [ $000 ]
                                                                      Page 1
========================================================================
```

OPERATING PERFORMANCE

SALES

Sales rose by 6.38 percent during 1987 to a level of 10000.
This compares with a 9.9 percent increase in the prior period.

GROSS PROFIT MARGIN

The gross profit margin improved for the third consecutive year.
It increased by one percentage point or less to 25.21%.
In the prior year the GPM rose one percentage point or less to 24.36%.

OPERATING PROFIT MARGIN

The operating profit margin declined for the third year in a row.
It decreased by one percentage point or less to 0.47%.
The decline was primarily due to increased operating expenses.
In the prior year the OPM fell by 1 percentage point or less to 1.33 %.

OPERATING EXPENSES

Total SG&A expenses rose on a common size basis in the current
year to 24.74 from 23.03 in 1986.
This was primarily attributable to the following increases in expenses:

The major contributor to the total change was rent
with a 1.24 percentage point increase over the prior period.

Also a factor was a 0.61 pctg. point rise in other salaries
and another item increasing 0.55 percentage points was insurance These increases were partially offset by the following expense decreases:

The largest decrease as a percent of sales was other sg&a expense
with a 0.44 percentage point decline from the prior period.

Also a factor was a 0.34 pctg. point fall in professional fees

Interest coverage in 1987 was 1.7 versus 1.9 in 1986.

TAC ANALYST                    X - AMPLE CORPORATION                        ABC BA

BGT / 6-23-88                                                               Page 2
========================  ============================  ===========================

Officer Salaries/Loans Receivable
---------------------------------

Officers salaries totalled    485 in the current year or    4.9% of sales.
This compares with    485 and    5.2%, respectively, in the prior year.

Officer loans receivable at year end    1987 stood at    10.
This represents a    3 increase over the prior year-end level.

NON-OPERATING INCOME / EXPENSE
------------------------------

Net non-operating items added more to profits than operating income.
Net non-operating income added    1.1 percentage points to the
operating margin which brought the pre-tax margin to a level of    1.6 %.
This rise was principally the result of other income/-expense
with a    0.74 percentage point contribution.

In the prior period, net non-operating items had a significant impact on the
pre-tax margin.

NET INCOME
----------

After an effective tax rate of    0% a net profit of    156
was generated which represented a net profit margin of    1.56%.
This is in comparison to a net profit of    131 in the prior period
which reflected a margin of    1.39%.

Dividends were paid in the current period amounting to    156 for
a payout ratio of    100.0%. The 1986 payout ratio was    32.8%.

Therefore the increase in Retained Earnings amounted to    0.

---------------------
FINANCIAL CONDITION
---------------------

LIQUIDITY - Current Position:
-----------------------------

The quick ratio declined from its prior static level to   0.6 .
The current ratio declined at the third consecutive year-end to   1.5 .
At year-end 1986 the quick and current ratios were    0.7 and    1.6
respectively.

Net working capital decreased at the statement date to    1509 .
It declined from its previous level of    1744 by    235 .

TAC ANALYST                X - AMPLE CORPORATION                    ABC BA?

BGT / 6-23-88                                                        Page 3
=====================   =============================   ========================

KEY BALANCE SHEET LEVELS
------------------------

Accounts Receivable
-------------------

The A/R turnover has consistently slowed to its current level of  59 days.
On an average basis the A/R turn increased from   49 days  to  54 days.

Receivable collections appear to be slow compared to selling terms.

Aging:

The aging shows an increase in total receivables over 30 days to   30%.
The aging shows an increase in total receivables over 60 days to   20%.
The aging shows an increase in total receivables over 90 days to   12%.
The aging shows an increase in receivables over 120 days to    5%.

Bad Debt Provision / Receivable Writeoffs
-----------------------------------------

The provision appears adequate as it covered estimated writeoffs of      9C

Reserve For Bad Debts
---------------------

The reserve appears inadequate compared to historical writeoffs.

The average receivable writeoffs during the past two years were   89
which equalled 5.8% of average receivables.  This compares to
the reserve/receivables ratio at the latest year-end of   3.0%.
The reserve/receivables ratio at the prior year-end was   3.2%.
Inventory
---------

The inventory turnover period improved for the third consecutive year
to a level of  119 days.
On an average basis the inventory turnover period improved to  120 days.

There were changes in the mix of certain of the components of inventory.

The Work in Process inventory component decreased from  58.0%  to  56.3
The Finished Goods component of inventory increased from  11.9%  to  13.7

The inventory valuation method used in   1987  was  LIFO

Accounts Payable
----------------

The payable turnover period quickened at the current year-end to  24 days.
The company appears to be discounting the trade.

TAC ANALYST                    X - AMPLE CORPORATION                           ABC BAN

BGT / 6-23-88                                                                  Page 4
========================   =======================================   ===========================

Fixed Assets
------------

At fiscal year-end net fixed assets rose    5.2%   to      2447 .
At this level capital assets represented   33.6% of total assets.
In comparison these assets equaled 32.9% at the prior year-end.

Debt
----

Total debt is broken down as follows for the past three years:

|                   | 1985 | 1986 | 1987 |
|-------------------|------|------|------|
| Short Term Debt   | 850  | 1177 | 1391 |
| Current Portion   | 250  | 250  | 250  |
| Long Term Debt    | 1330 | 1430 | 1260 |
| Capital Leases    | 4    | 2    | 2    |
| Subordinated Debt | 0    | 0    | 78   |
| Total             | 2434 | 2859 | 2981 |

There was a net increase in debt in the current year of     122 .
The increase was mainly in short term debt.

Long Term Debt Maturities for the next five years are as follows:

| Within 1 yr | Year 2 | Year 3 | Year 4 | Year 5 | Subsequ. |
|-------------|--------|--------|--------|--------|----------|
| 250         | 250    | 500    | 512    | 0      | 78       |

Unless previously approved, it would appear that there was a violation
of the Subordination Agreement as the year-end level fell below the
Agreement amount by     22    to      78 .

Net Worth
---------
Tangible net worth decreased from the previous level of    2752   to    2749
at the current year-end.
The decrease was mainly due to the increase in treasury stock.
The  capital base at year-end  stood at    2827 versus the
previous year-end capital base level of    2752 .

Leverage
--------

Total liabilities increased over the  prior year-end by    208   to    4424
This together with the TNW decrease resulted in an increase in leverage.

Debt/TNW rose but stayed relatively stable with the prior year-end at    1.61

The  TUL/Capital Base   remained level at    1.54
Contingent Liabilities were  3000 at   year-end  against    2500 last year.
Leverage including  contingent liabilities  increased to   2.60  from    2.44

TAC ANALYST  X - AMPLE CORPORATION  ABC BA

BGT / 6-23-88  Page 5

CASH FLOW

|  | 1986 | 1987 |
|---|---|---|
| GROSS CASH REVENUES | 9155 | 9774 |
| GROSS CASH PROFIT | 2394 | 2506 |
| CASH AFTER OPERATING EXPENSE | 648 | 475 |
| CASH AVAILABLE FOR INTEREST & DIVIDENDS | 482 | 483 |
| NET CASH INCOME | 215 | 91 |
| CASH AFTER DEBT SERVICE | -35 | -159 |
| EXCESS CASH/-FINANCING NEED | -634 | -531 |

The company posted an increase in 1987 total gross cash revenues to 9774 from the previous fiscal year level of 9155 .
The primary reason for the improvement in the most recent period was the increase in sales.

The company generated an increased gross cash profit of 2506 due mainly to the increase in gross cash revenues.

The largest offsetting factor to the overall change in gross cash profit was the increase in cost of sales.

Cash after operating expenses was weaker in the current year primarily due to the increase in selling, general and administrative expenses.

Cash available for interest and dividends improved to 483 mainly due to the decrease in net other cash expense.
This was sufficient to cover interest of 236 and cash dividends of 156 thereby resulting in net cash income of 91 .
When compared to the 1986 level, this is a decrease of 124 .

This net cash income level was not adequate to meet debt maturities of 250 leaving a deficit after debt service of -159 .

In the prior year, internal cash flow of 215 was insufficient to cover the scheduled 1986 long term debt maturities of 250 .

TAC ANALYST                X - AMPLE CORPORATION                      ABC BANK

BGT / 6-23-88                                                         Page 6
========================  ============================  ========================

Net capital expenditures in 1987 were 372 versus 595 in the prior year.
The net result was a cash requirement (after capital expenditures and changes in the investments/advances account) of 531.

This financing need was met with the following net sources (including debt, equity and changes in the cash and marketable securities accounts):

[-Dr/+Cr]

```
    Net Cash Requirement                            -531

Increase in Short Term Debt          214
    Increase in Long Term Debt*           80
    Increase in Subordinated Debt         78
    Net increase in debt                           372

Equity Infusion                        1
    Increase in Treasury Stock            -4
    FX Translation Adjustment Change       3

Net change in equity                   0
                            Subtotal                 372

Excess / -Shortfall                             -159
    Reduction of Cash and Marketable Securities      159
```

* For Cash Flow analysis purposes, the change in LTD is calculated excluding the current portion for the beginning year since this is treated as a separate use of cash earlier in the cash flow.

NOTE: The FX Translation Adjustment change, a non cash item, is presented separately as a component of the equity changes as it is not feasable to determine (and offset it against) the exact assets to which it relates.

Presuming capital expenditures and changes in the investment account were partially funded with long term debt and/or equity, the cash flow analysis can be further refined as follows:

```
    Operating cash flow (after debt service)        -159

Net Capital Expenditures            -372
    Net Change in Investments              0
    Subtotal                                        -372

Net Increase Long Term Debt          158
    Net change in equity                   0
    Subtotal                                         158

Excess / -Shortfall                             -214

Cash deficit before short term financing    -373

Increase: short term debt            214
    Decrease: cash and marketable securities 159
    Total                                            373
```

NOTE: Changes in the cash account are considered part of short term financing.

TAC ANALYST                X - AMPLE CORPORATION                    ABC BA?
BGT / 6-23-88                                                       Page 7
=======================  ========================  =======================

```
                      ==========================
                      RMA INDUSTRY COMPARISON
                      ==========================
```

The gross profit margin of   25.2% was weaker than the RMA
industry average of    32.4%

Operating expenses/Sales of  22.4% was stronger than the RMA
industry average of    27.9%

The pretax profit margin of   1.6% was weaker than the RMA
industry average of    2.9%

FINANCIAL CONDITION - RATIO ANALYSIS

| | | |
|---|---|---|
| Current Ratio | Within Industry Range | Weaker Than Median |
| Quick Ratio | Within Industry Range | Weaker Than Median |
| A/R Turnover | Outside Industry Range | Slower Than Industry Average |
| Inv. Turnover | Within Industry Range | Slower Than Median |
| A/P Turnover | Within Industry Range | Quicker Than Median |
| Sales/Working Cap | Within Industry Range | Equal To Median |
| Interest Coverage | Within Industry Range | Weaker than Median |
| Net Inc.+ Noncash/ Current Portion | Within Industry Range | Weaker than Median |
| Debt/Worth | Within Industry Range | Weaker than Median |
| Sales/Tot Assets | Within Industry Range | Weaker than Median |
| Officer Comp/Sales | Within Industry Range | Higher than Median |

EXAMPLE OF QUESTIONS ANALYTICAL REPORT FOR HYPOTHETICAL COMPANY
X-AMPLE CORP BASED ON ATTACHED DATABASE  -  WITH SAMPLE
ANSWERS/COMMENTS ENTERED IN THE APPROPRIATE AREAS

TAC INQUIRY              X - AMPLE CORPORATION              BANK NAME
                         SEAFORD, NEW YORK

==============================================================================
TAC  -  QUESTIONS FOR MANAGEMENT              [ $000 ]              Page 1
==============================================================================

Why did the  net sales level  increase by   6.0% ?

Sales increased due to continued geographic expansion as well as
------------------------------------------------------------------------------
the introduction of several new product lines.  Management expects
------------------------------------------------------------------------------
volume to increase at a similar pace through the new year.
------------------------------------------------------------------------------

What was the reason for the  gross profit margin improvement of  0.85
percentage points?

The reason for the GPM improvement involved a price increase in July.
------------------------------------------------------------------------------
A change in the product mix also contributed to the increase.
------------------------------------------------------------------------------

------------------------------------------------------------------------------

Within the total increase in S G & A expenses of   1.71 percentage points,
what was the  reason for the  increase in rent
(the primary contributor) by  1.2 percentage points?

Additionally, with a    0.61 percentage point rise,
what was the reason  behind the change in other salaries
along with the 0.55 percentage  point  move  in insurance The opening of the Dallas facility was the reason for the increase in
------------------------------------------------------------------------------
operating expenses.
------------------------------------------------------------------------------

As the major  offset to the above,  what caused other sg&a expense
to decrease by 0.44 percentage points?

Also, what was the  reason for the  decrease in professional fees
which equaled  0.34 percentage points?
The decrease in other SG&A related to increased efficiencies.  The decrease
------------------------------------------------------------------------------
in professional fees related to the switch from a Big Eight accounting
------------------------------------------------------------------------------
firm to a local CPA which was cleared with us.
------------------------------------------------------------------------------

TAC INQUIRY     X - AMPLE CORPORATION                           BANK NAME
                SEAFORD, NEW YORK
                                                                Page 2

What are the repayment plans for the officer loans -receivable?
What was the purpose of the increased level of these loans?
Management does not have a specific repayment schedule for these loans.
---
The increase funded some home improvements.
---

Net non-operating items significantly impacted the pre-tax margin in    1986
This section added   1.1 percentage points to the operating margin.

Specifically, what was the nature of the other income
which made the largest contribution with    0.7 percentage points?

Are any of these items which may be unusual, expected to recur in
in the future and if so, to what extent?

What does the company plan to do to improve the quality of its earnings?
Other income resulted from the sale of certain excess fixed assets.
---
This is not expected to recur in these amounts. We have made management
---
aware of our concern with the operating earnings trend.
---

Why did the effective tax rate differ from the Statutory rate?
The effective tax rate was lower due to job tax credits.
---
---

What were the reasons for the deferred taxes?
Deferred taxes arise mainly due to depreciation accounting differences.
---
---

TAC INQUIRY       X - AMPLE CORPORATION                        BANK NAME
                  SEAFORD, NEW YORK
                                                                    Page 3
===============================================================================

Dividends were equal to net earnings in the current year.
Are these levels expected to continue, or to change in the future?

We have advised management that dividends should remain at reasonable
levels in the future.

Why did the receivable turnover slow at the current fiscal year-end?
Is the company experiencing any general slowing in collections or did
year-end sales activity produce this result.

The average turnover calculation would appear to confirm a general slowing.

Why do collections appear to be unduly slow compared to selling terms?

The receivable aging would appear to indicate slowing compared to the
prior year-end. Are there any specific reasons for this?; Any customer
or customers in particular who may be paying slower or involved in
disputes, litigation, etc.?
The slowing in the receivables has been described as an overall industry
trend. We have checked with other companies who confirm this. There
do not appear to be any specific problem accounts.

Writeoffs in the current year appeared to be material at      90 .
Writeoffs in the prior year appeared to be material at        87 .
Are there any problems or potential problems in the receivables?
What is the company's charge-off policy and historical recovery experience?
The past two years reflected a cleanout of old uncollectible accounts
which were still being carried on the books. The accountant advises us
that the remaining receivables are all collectable.

| TAC INQUIRY | X - AMPLE CORPORATION  SEAFORD, NEW YORK | BANK NAME |
|---|---|---|
| | | Page 4 |

In light of recent write-off experience, does management intend to increase the reserve for bad debts?
An increase to the reserve does not appear to be necessary.

What is the reason for the improvement in the inventory turn?

Why have there been changes in the mix of the components of inventory?

What level of insurance does the company carry on its inventory?

The company's installation of a more sophisticated computer system enabled to get better control of its inventory levels. This was also reflected in the mix change. Inventory is insured for $3,000.

Does the company generally discount its trade payables?

Management has always discounted its trade payables and often uses our credit line for this purpose.

What are capex expected to be in the future? Are there any major new purchases or replacements planned in the near term and if so how will these expenditures be financed?

What level of insurance does the company carry on its fixed assets?
The company expects to make some material equipment purchases toward the end of this year and will be approaching us for financing. Fixed Assets are currently insured for $5,000 with the bank named as loss payee.

| TAC INQUIRY | X - AMPLE CORPORATION<br>SEAFORD, NEW YORK | BANK NAME |

Page 5

What is the nature of the Investments and Advances?
Investments and advances relate to an affiliate which manufactures a minor product line for the company.

What is the specific nature of the intangible assets?
Intangibles are primarily composed of Goodwill related to their purchase of another company several years ago.

Did the net total increase in debt include any obligations other than those o
BANK NAME
If so, what were the sources and terms of this new debt?
To whom were the debt reductions made in long term debt.

The company obtained financing form XYZ Bank last year. They remain happy with our relationship but wanted to have more than one financing source. We retain the bulk of the relationship.

There would appear to have been a violation of the Subordination Agreement.
If this was the case, did management request a waiver of this in advance and was it approved by the bank?
We were not advised of the decrease in Subordinated debt. Management has agreed to reinvest this cash within the next three months.

Changes in the Other Assets and/or Other Liabilities levels, short and long term, appear to have had a material effect on net cash income in the current year. What was the nature of the other assets and/or liabilities which contributed most to this?
The major other asset/liability change was the increase in other assets which represented a loan made to a non-affiliated company.
This is expected to be repaid in six months.

| TAC INQUIRY | X - AMPLE CORPORATION | BANK NAME |
| --- | --- | --- |
| | SEAFORD, NEW YORK | |

What are the details behind the increase in Treasury Stock?
The treasury stock increase related to the retirement of Mr. Smith.

What are the details behind the FX translation adjustment?
What are the company's primary foreign subsidiaries; what are the
primary foreign assets; and in which countries are they located?
The FX translation adjustment relates to the company's manufacturing subsidiary in Germany.

What is the specific nature of the contingent liabilities?
Contingent liabilities chiefly consist of a guarantee by the company for the mortgage on a building in the principal's name.

The company's level of net cash income in the current year, unless
enhanced, will not be sufficient to meet the scheduled long term
debt maturities for fiscal 1987 .

The current level of net cash income falls short of the level necessary
to meet maturities in certain of the next two years.

Given this, how does the company intend to improve its internal cash
flow to the extent necessary to meet these maturities?
Management plans to tighten its receivable collections to improve cash flow. If necessary it will also stop discounting its bills.

Has the bank been provided with any current interim information
either verbally or with a trial balance or financial statements? If so,
what is the updated progress on sales levels, consistency of gross and
operating margins, and other key areas which may have been discussed
with management in the past.
We have been provided with a verbal update on interim operations. Sales continue to increase and profit margins are better than last year due to another price increase which was accepted well by its customers. Receivable collections have improved as a result of the program recently instituted.

TAC INQUIRY        X - AMPLE CORPORATION                    BANK NAME
                   SEAFORD, NEW YORK

GENERAL COMMENTS:

Is management aware that leverage (TUL/Capital Base) may be
considered by the bank to be high and that it is increasing?
What steps are planned to reverse this trend and bring leverage to
an acceptable level.

Could management arrange for additional equity or subordinated debt
to improve the capital base and leverage position?

Is management aware that its net cash income level was not sufficient
to meet current debt service and that these payments, if made, came
to some extent from sources other than the company's operations?

Are consolidating statements available for review?

An area is provided below for any further remarks that the analyst
may wish to make.
We have made management aware we are concerned about the leverage trend.
_____
We expect that the collection improvements and return of dividends
_____
to a reasonable level will help this matter.
_____
We have asked the accountant to prepare consolidating statements for
_____
the next fiscal year end.
_____

_____

_____

EXAMPLE COMPLETED REPORT INTEGRATING SAMPLE ANSWERS/COMMENTS TO
THE QUESTIONS INTO THE ANALYSIS ANALYTICAL REPORT

```
TAC ANALYST              X - AMPLE CORPORATION                   ABC BAN
                         SEAFORD, NEW YORK
BGT / 6-23-88
=======================  ==============================  =========================
TAC    ANALYST      [ $000 ]                                           Page 1
=================================================================================
```

OPERATING PERFORMANCE

SALES

Sales rose by 6.4 percent during 1987 to a level of 10000.
This compares with a 9.9 percent increase in the prior period.

Sales increased due to continued geographic expansion as well as
the introduction of several new product lines. Management expects
volume to increase at a similar pace through the new year.

GROSS PROFIT MARGIN

The gross profit margin improved for the third consecutive year.
It increased by one percentage point or less to 25.21%.
In the prior year the GPM rose one percentage point or less to 24.36%.

The reason for the GPM improvement involved a price increase in July.
A change in the product mix also contributed to the increase.

OPERATING PROFIT MARGIN

The operating profit margin declined for the third year in a row.
It decreased by one percentage point or less to 0.47%.
The decline was primarily due to increased operating expenses.
In the prior year the OPM fell by 1 percentage point or less to 1.3 %.

OPERATING EXPENSES

Total SG&A expenses rose on a common size basis in the current
year to 24.74 from 23.03 in 1986.
This was primarily attributable to the following increases in expenses:

The major contributor to the total change was rent
with a 1.24 percentage point increase over the prior period.

Also a factor was a 0.61 pctg. point rise in other salaries
and another item increasing 0.55 percentage points was insurance The opening of the Dallas facility was the reason for the increase in
operating expenses.

TAC ANALYST                    X - AMPLE CORPORATION

BGT / 6-23-88                                                                    Page 2
==============================================================================

These increases were partially offset by the following expense decreases:

The largest decrease as a percent of sales was other sg&a expense
with a 0.44 percentage point decline from the prior period.

Also a factor was a 0.34 pctg. point fall in professional fees

The decrease in other SG&A related to increased efficiencies. The decrease
in professional fees related to the switch from a Big Eight accounting
firm to a local CPA which was cleared with us.

Interest coverage in 1987 was 1.7 versus 1.9 in 1986.

Officer Salaries/Loans Receivable
---------------------------------

Officers salaries totalled 485 in the current year or 4.9% of sales.
This compares with 485 and 5.2%, respectively, in the prior year.

Officer loans receivable at year end 1987 stood at 10.
This represents a 3 increase over the prior year-end level.

Management does not have a specific repayment schedule for these loans.
The increase funded some home improvements.

NON-OPERATING INCOME / EXPENSE
------------------------------

Net non-operating items added more to profits than operating income.
Net non-operating income added 1.1 percentage points to the
operating margin which brought the pre-tax margin to a level of 1.56 %.
This rise was principally the result of other income/-expense
with a 0.74 percentage point contribution.

In the prior period, net non-operating items had a significant impact on the
pre-tax margin.

Other income resulted from the sale of certain excess fixed assets.
This is not expected to recur in these amounts. We have made management
aware of our concern with the operating earnings trend.

NET INCOME
----------

After an effective tax rate of 0.0% a net profit of 156
was generated which represented a net profit margin of 1.56%.
This is in comparison to a net profit of 131 in the prior period
which reflected a margin of 1.39%.

The effective tax rate was lower due to job tax credits.

TAC ANALYST                X - AMPLE CORPORATION

BGT / 6-23-88                                                                Page 3

Deferred taxes arise mainly due to depreciation accounting differences.

Dividends were paid in the current period amounting to    156 for
a payout ratio of   100.0%.   The 1986 payout ratio was   32.8%.

Therefore, the increase in Retained Earnings amounted to     0

We have advised management that dividends should remain at reasonable
levels in the future.

---

FINANCIAL CONDITION

LIQUIDITY - Current Position:

The quick ratio declined from its prior static level to  0.6 .
The current ratio declined at the third consecutive year-end to  1.5 .
At year-end  1986 the quick and current ratios were   0.67  and   1.65
respectively.

Net working capital decreased at the statement date to    1509 .
It declined from its previous level of    1744   by       235 .

KEY BALANCE SHEET LEVELS

Accounts Receivable

The A/R turnover has consistently slowed to its current level of   59 days.
On an average basis the A/R turn increased from     49 days to   54 days.

Receivable collections appear to be slow compared to selling terms.

Aging:

The aging shows an increase in total receivables over 30 days to   30%.
The aging shows an increase in total receivables over 60 days to   20%.
The aging shows an increase in total receivables over 90 days to   12%.
The aging shows an increase in receivables over 120 days to         5%.

The slowing in the receivables has been described as an overall industry
trend.  We have checked with other companies who confirm this. There
do not appear to be any specific problem accounts.

TAC ANALYST          X - AMPLE CORPORATION

BGT / 6-23-88                                                             Page 4

Bad Debt Provision / Receivable Writeoffs

The provision appears adequate as it covered estimated writeoffs of    90

The past two years reflected a cleanout of old uncollectible accounts
which were still being carried on the books. The accountant advises us
that the remaining receivables are all collectable.

Reserve For Bad Debts

The reserve appears inadequate compared to historical writeoffs.

The average receivable writeoffs during the past two years were    89
which equalled 5.8% of average receivables. This compares to
the reserve/receivables ratio at the latest year-end of    3.0%.
The reserve/receivables ratio at the prior year-end was    3.2%.

An increase to the reserve does not appear to be necessary.

Inventory

The inventory turnover period improved for the third consecutive year
to a level of 119 days.
On an average basis the inventory turnover period improved to 120 days.

There were changes in the mix of certain of the components of inventory.

The Work in Process inventory component decreased from    58.0%    to    56.3%
The Finished Goods component of inventory increased from    11.9%    to    13.7%

The company's installation of a more sophisticated computer system
enabled to get better control of its inventory levels. This was also
reflected in the mix change. Inventory is insured for $3,000.

The inventory valuation method used in    1987    was    LIFO

TAC ANALYST        X - AMPLE CORPORATION

BGT / 6-23-88                                                           Page 5

Accounts Payable

The payable turnover period quickened at the current year-end to 24 days.
The company appears to be discounting the trade.

Management has always discounted its trade payables and often uses our
credit line for this purpose.

Fixed Assets.

At fiscal year-end net fixed assets rose   5.2%   to   2447 .
At this level capital assets represented   33.6% of total assets.
In comparison these assets equaled 32.9% at the prior year-end.

The company expects to make some material equipment purchases toward the
end of this year and will be approaching us for financing. Fixed Assets
are currently insured for $5,000 with the bank named as loss payee.

Investments and Advances

Investments and advances relate to an affiliate which manufactures
a minor product line for the company.

Debt

Total debt is broken down as follows for the past three years:

|                    | 1985 | 1986 | 1987 |
|--------------------|------|------|------|
| Short Term Debt    | 850  | 1177 | 1391 |
| Current Portion    | 250  | 250  | 250  |
| Long Term Debt     | 1330 | 1430 | 1260 |
| Capital Leases     | 4    | 2    | 2    |
| Subordinated Debt  | 0    | 0    | 78   |
| Total              | 2434 | 2859 | 2981 |

There was a net increase in debt in the current year of   122 .
The increase was mainly in short term debt.

The company obtained financing form XYZ Bank last year. They remain happy
with our relationship but wanted to have more than one financing source. We
retain the bulk of the relationship.

Long Term Debt Maturities for the next five years are as follows:

| Within 1 yr | Year 2 | Year 3 | Year 4 | Year 5 | Subseque |
|-------------|--------|--------|--------|--------|----------|
| 250         | 250    | 500    | 512    | 0      | 78       |

TAC ANALYST          X - AMPLE CORPORATION

BGT / 6-23-88

Unless previously approved, it would appear that there was a violation
of the Subordination Agreement as the year-end level fell below the
Agreement amount by    22    to    78 .

We were not advised of the decrease in Subordinated debt.  Management has
agreed to reinvest this cash within the next three months.

Net Worth
---------

Tangible net worth decreased from the previous level of    2752    to    2749
at the current year-end.
The decrease was mainly due to the increase in treasury stock.
The  capital base at year-end  stood at     2827 versus the
previous year-end capital base level of    2752 .

The treasury stock increase related to the retirement of Mr. Smith.

The FX translation adjustment relates to the company's manufacturing
subsidiary in Germany.

Intangibles are primarily composed of Goodwill related to their purchase
of another company several years ago.

Leverage
--------

Total liabilities increased over the  prior year-end by    208    to    4424
This together with the TNW decrease resulted in an increase in leverage.

The  TUL/Capital Base   remained level at    1.54
Contingent Liabilities were

Debt/TNW rose but stayed relatively stable with the prior year-end at    1.61
Leverage including  contingent liabilities  increased to   2.60   from    2.44

Contingent liabilities chiefly consist of a guarantee by the company
for the mortgage on a building in the principal's name.

TAC ANALYST  X - AMPLE CORPORATION

BGT / 6-23-88                                                                    Page 7

CASH FLOW

|  | 1986 | 1987 |
|---|---|---|
| GROSS CASH REVENUES | 9155 | 9774 |
| GROSS CASH PROFIT | 2394 | 2506 |
| CASH AFTER OPERATING EXPENSE | 648 | 475 |
| CASH AVAILABLE FOR INTEREST & DIVIDENDS | 482 | 483 |
| NET CASH INCOME | 215 | 91 |
| CASH AFTER DEBT SERVICE | -35 | -159 |
| EXCESS CASH/-FINANCING NEED | -634 | -531 |

The company posted an increase in 1987 total gross cash revenues to 977. from the previous fiscal year level of 9155 .
The primary reason for the improvement in the most recent period was the increase in sales.

The company generated an increased gross cash profit of 2506 due mainly t( the increase in gross cash revenues.

The largest offsetting factor to the overall change in gross cash profit was the increase in cost of sales.

Cash after operating expenses was weaker in the current year primarily due to the increase in selling, general and administrative expenses.

Cash available for interest and dividends improved to 483 mainly due to the decrease in net other cash expense.
This was sufficient to cover interest of 236 and cash dividends of 15€ thereby resulting in net cash income of 91 .
When compared to the 1986 level, this is a decrease of 124 .

This net cash income level was not adequate to meet debt maturities of 25C leaving a deficit after debt service of -159 .

In the prior year, internal cash flow of 215 was insufficient to cover the scheduled 1986 long term debt maturities of 250 .

TAC ANALYST                X - AMPLE CORPORATION

BGT / 6-23-88

```
Net capital expenditures in 1987  were   372 versus  . 595
in the prior year.
The net result  was a cash requirement (after capital expenditures and
changes in the investments/advances account) of    531 .

This financing need was met with the following net sources (including
debt,equity and changes in the cash and marketable securities accounts):
                                                              [-Dr/+C
     Net Cash Requirement                                -531

Increase in Short Term Debt          214
     Increase in Long Term Debt*           80
     Increase in Subordinated Debt         78
     Net increase in debt                   0     372

Equity Infusion                        1
     Increase in Treasury Stock            -4
     FX Translation Adjustment Change       3

Net change in equity                          0
                                Subtotal         372

Excess / -Shortfall                             -159
     Reduction of Cash and Marketable Securities     159
```

* For Cash Flow analysis purposes, the change in LTD is calculated excluding
  the current portion for the beginning year since this is treated as a
  separate use of cash earlier in the cash flow.

NOTE: The FX Translation Adjustment change, a non cash item, is presented
      separately as a component of the equity changes as it is not
      feasable to determine (and offset it against) the exact assets to
      which it relates.

Presuming capital expenditures and changes in the investment account were
partially funded with long term debt and/or equity, the cash flow analysis
can be further refined as follows:

```
     Operating cash flow (after debt service)        -159

Net Capital Expenditures             -372
     Net Change in Investments               0
     Subtotal                                     -372

Net Increase Long Term Debt           158
     Net change in equity                    0
     Subtotal                                      158

Excess / -Shortfall                            -214

Cash deficit before short term financing  -373

Increase: short term debt             214
     Decrease: cash and marketable securities 159
     Total                                          373
```

NOTE: Changes in the cash account are considered part of short term financing

TAC ANALYST                X - AMPLE CORPORATION

BGT / 6-23-88

Net Other Cash Income/Expense had a material effect on Net Cash Income.
The major other asset/liability change was the increase in other assets
which represented a loan made to a non-affiliated company.
This is expected to be repaid in six months.
Net Cash Income/Loss Comments:
Management plans to tighten its receivable collections to improve
cash flow. If necessary it will also stop discounting its bills.

Interim Information

We have been provided with a verbal update on interim operations. Sales
continue to increase and profit margins are better than last year due to
another price increase which was accepted well by its customers. Receivable
collections have improved as a result of the program recently instituted.

General Comments

We have made management aware we are concerned about the leverage trend.
We expect that the collection improvements and return of dividends
to a reasonable level will help this matter.
We have asked the accountant to prepare consolidating statements for
the next fiscal year end.

==========================
RMA INDUSTRY COMPARISON
==========================

The gross profit margin of     25.2% was weaker than the RMA
industry average of    32.4%

Operating expenses/Sales of    22.4% was stronger than the RMA
industry average of    27.9%

The pretax profit margin of    1.6% was weaker than the RMA
industry average of    2.9%

FINANCIAL CONDITION - RATIO ANALYSIS

| Ratio | Range | Comparison |
|---|---|---|
| Current Ratio | Within Industry Range | Weaker Than Median |
| Quick Ratio | Within Industry Range | Weaker Than Median |
| A/R Turnover | Outside Industry Range | Slower Than Industry Average |
| Inv. Turnover | Within Industry Range | Slower Than Median |
| A/P Turnover | Within Industry Range | Quicker Than Median |
| Sales/Working Cap | Within Industry Range | Equal To Median |
| Interest Coverage | Within Industry Range | Weaker than Median |
| Net Inc.+ Noncash/ Current Portion | Within Industry Range | Weaker than Median |
| Debt/Worth | Within Industry Range | Weaker than Median |
| Sales/Tot Assets | Within Industry Range | Weaker than Median |
| Officer Comp/Sales | Within Industry Range | Higher than Median |

What is claimed is:

1. A method of providing a narrative analytical report comprising the steps of:
   (a) entering data into a data base in a processing unit;
   (b) processing said data into a predetermined format for use in analyzing same;
   (c) providing a plurality of predetermined mutually exclusive narrative conclusions which are determined by a predetermined group of mutually exclusive formulas, said narrative conclusions comprising a narrative formed from whole sentences, sentence fragments, words, phrases and/or data base items;
   (d) providing a plurality of such predetermined groups, each such groups containing a plurality of said narrative conclusions which are mutually exclusive in such respective groups;
   (e) analyzing said data in said predetermined format and based upon such analysis generating a respective predetermined conclusion, if a conclusion applies, from each group for a plurality of said groups; and
   (f) providing an output comprising an analytical report generated as a result of said analysis wherein said report is in the narrative form and comprises a plurality of said predetermined narrative conclusions which will depend upon the data entered into the database and the analysis thereof.

2. The method in accordance with claim 1 which includes the following steps:
   (g) grouping a plurality of said mutually exclusive narrative conclusions into respective groups directed toward a particular topic which is to be addressed in the analytical report;
   (h) selecting from such groups the true such conclusion should any conclusions apply; and
   (i) providing an analytical report which includes said conclusion.

3. The method in accordance with claim 2, which includes the following step:
   (j) providing a plurality of such groups each of which is directed to a particular topic covered by the analytical report.

4. The method in accordance with claim 3, which includes the following steps:
   (k) provide a means for printing out the analytical report; and
   (l) printing out the analytical report.

5. A method of providing a narrative analytical report comprising the steps of:
   (a) entering data into a data base in a processing unit;
   (b) processing said data into a predetermined format for use in analyzing same;
   (c) providing a plurality of predetermined mutually exclusive narrative conclusions which are determined by a predetermined group of mutually exclusive formulas, said narrative conclusions comprising a narrative formed from whole sentences, sentence fragments, words, phrases and/or database items;
   (d) providing a plurality of such predetermined groups, each such groups containing a plurality of said narrative conclusions which are mutually exclusive in such respective groups;
   (e) analyzing said data in said predetermined format and generating a respective predetermined conclusion based upon such analysis, if a conclusion applies, from each group for a plurality of said groups;
   (f) analyzing said data in said predetermined format and generating request(s) to the user for additional data therefrom by way of predetermined question or questions selected based upon such analysis;
   (g) providing means for entering said additional data into the processing unit; and
   (h) providing an output comprising an analytical report generated as a result of said analysis wherein said report is in the narrative form and comprises a plurality of said predetermined narrative conclusions which will depend upon the data entered into the database and the analysis thereof and the additional data entered in response to said generated request(s).

6. The method in accordance with claim 5 which includes the following steps:
   (i) grouping a plurality of said mutually exclusive narrative conclusions into group(s) directed toward a particular topic which is to be addressed in the analytical report;
   (j) selecting from such groups the true such conclusion should any conclusions apply; and
   (k) providing an analytical report which includes said conclusion.

7. The method in accordance with claim 6, which includes the following step:
   (1) providing a plurality of such group each of which is directed to a particular topic covered by the analytical report.

8. The method in accordance with claim 7, which includes the following steps:
   (m) providing a means for printing out the analytical report; and
   (n) printing out the analytical report.

9. The method in accordance with claim 8, which includes the following step:
   (o) integrating the additional data entered in response to said request(s) generated with the plurality of predetermined conclusions in the analytical report.

10. The method in accordance with claim 5, which includes the following step:
    (i) integrating the additional data entered in response to said request(s) generated with the plurality of predetermined conclusions in the analytical report.

11. A method of providing a narrative analytical report of banking/financial services and the like, comprising the steps of:
    (a) entering data into a database in the format of a banking-type spread sheet in a processing unit;
    (b) processing said data within a banking-type spread sheet;
    (c) accessing selected items of data in said banking-type spread sheet;
    (d) providing a plurality of predetermined mutually exclusive narrative conclusions which are determined by a predetermined group of mutually exclusive formulas, said narrative conclusions comprising a narrative formed from whole sentences, sentence fragments, words, phrases and/or database items;
    (e) providing a plurality of such groups containing a plurality of said narrative conclusions;
    (f) analyzing said data and based upon such analysis assigning a respective predetermined conclusion from each group for a plurality of said groups; and (g) providing an output of a financial analytical report resulting from said analysis wherein said financial report is in the narrative form and comprises a plurality of said predetermined narrative conclusions which will depend upon the data entered into the data base and the analysis thereof.

12. The method in accordance with claim 11 which includes the following steps:
(h) grouping a plurality of said mutually exclusive narrative conclusions into a group directed toward a particular topic which is to be addressed in the financial report;
(i) selecting from such group the true such conclusion should any conclusions apply; and
(j) providing a financial analytical report which includes said conclusion.

13. The method in accordance with claim 12, which includes the following step:
(k) providing a plurality of such groups each of which is directed to a particular topic.

14. The method in accordance with claim 13, which includes the following steps:
(l) analyzing said data in said format and generating request(s) to the user for additional data therefrom by way of predetermined question or questions selected based upon such analysis;
(m) providing means for entering said additional data into the processing unit; and
(n) providing in the output the data entered in response to said generated request(s).

15. The method in accordance with claim 14, which includes the following steps:
(o) provide a means for printing out the financial analytical report; and
(p) printing out the financial analytical report.

16. A method of providing a narrative output comprises the steps of:
(a) entering data into a data base in a processing unit;
(b) processing said data into a predetermined format for use in analyzing same;
(c) providing at least one predetermined narrative phrase which is determined by a predetermined group of mutually exclusive formulas, said narrative phrase comprising a narrative formed from whole sentences, sentence fragments, words, phrases and/or database items;
(d) analyzing said data in said predetermined format and based upon such analysis generating a predetermined phrase; and
(e) providing an output generated as a result of said analysis wherein said output is in the narrative form and includes said predetermined narrative phrase which will depend on the data entered into the database and the analysis thereof.

* * * * *